(12) United States Patent
Clare et al.

(10) Patent No.: US 6,414,955 B1
(45) Date of Patent: Jul. 2, 2002

(54) DISTRIBUTED TOPOLOGY LEARNING METHOD AND APPARATUS FOR WIRELESS NETWORKS

(75) Inventors: Loren P. Clare, Thousand Oaks; Jonathan R. Agre, Oak Park, both of CA (US)

(73) Assignee: Innovative Technology Licensing, LLC, Thousand Oaks, CA (US)

( * ) Notice: Subject to any disclaimer, the term of this patent is extended or adjusted under 35 U.S.C. 154(b) by 0 days.

(21) Appl. No.: 09/274,827

(22) Filed: Mar. 23, 1999

(51) Int. Cl.$^7$ ............................................. H04L 12/56
(52) U.S. Cl. ..................... 370/390; 375/219; 375/221; 370/400
(58) Field of Search ................................. 375/219, 295, 375/220, 221, 222; 370/254, 255, 390, 400; 709/213, 218, 220

(56) References Cited

U.S. PATENT DOCUMENTS

| | | | | |
|---|---|---|---|---|
| 4,855,713 | A | | 8/1989 | Brunius ...................... 340/506 |
| 5,241,542 | A | | 8/1993 | Natarajan et al. ........... 370/95.3 |
| 5,295,154 | A | | 3/1994 | Meier et al. .................... 375/1 |
| 5,428,636 | A | | 6/1995 | Meier .......................... 375/202 |
| 5,475,687 | A | | 12/1995 | Markkula, Jr. et al. .... 370/85.1 |
| 5,553,076 | A | | 9/1996 | Behtash et al. ............. 370/95.3 |
| 5,854,994 | A | | 12/1998 | Canada et al. ................. 702/56 |
| 6,321,270 | B1 | * | 11/2001 | Crawley ....................... 709/238 |
| 6,330,671 | B1 | * | 12/2001 | Aziz ............................. 713/163 |
| 6,332,165 | B1 | * | 12/2001 | Hagersten et al. .......... 709/238 |
| 6,353,817 | B1 | * | 3/2002 | Jacobs et al. .................. 706/50 |

OTHER PUBLICATIONS

Norman Abramson, "The Throughput of Packet Broadcasting Channels", *IEEE Transactions On Communications*, vol. COM-25, No. 1, pp. 117-128, Jan. 1977.

Bhatnagar et al., "Layer Net : A New Self-Organizing Network Protocol", *IEEE Military Communications Record*, vol. 2, pp. 845-849, 1990.

Ephremides, et al., "A Design Concept for Reliable Mobile Radio Networks with Frequency Hopping Signaling", *Proceedings of the IEEE*, vol. 75, No. 1, pp. 56-73, Jan. 1987.

C. David Young, "A Unifying Dynamic Distributed Multi-channel TDMA Slot Assignment Protocol", *Rockwell International Working Paper*, pp. 1-29, Oct. 25, 1995.

C. David Young, "USAP: A Unifying Dynamic Distributed Multichannel TDMA Slot Assignment Protocol", *IEEE Military Communications Conference Record*, vol. 1, p. 235, 1996.

* cited by examiner

*Primary Examiner*—Chi Pham
*Assistant Examiner*—Emmanuel Bayard
(74) *Attorney, Agent, or Firm*—Koppel, Jocobs, Patrick & Heybl

(57) ABSTRACT

A wireless network of communicating devices, preferably including sensors, uses a distributed method of topology learning to organize multiple hop, relayed communication among the devices and with users. The method of topology learning identifies interference neighbors and communication neighbors for each device, preferably using ranging between devices and distributed calculation to limit the number of devices involved in each step of the topology learning method, thereby conserving energy and bandwidth. The identification of interference neighbors and communication neighbors for each device in the network facilitates scheduling of communications in any of a variety of multiple access protocols.

19 Claims, 19 Drawing Sheets

DISTRIBUTED TOPOLOGY LEARNING METHOD AND APPARATUS FOR WIRELESS NETWORKS

BACKGROUND OF THE INVENTION

1. Field of the Invention

This invention relates to wireless networks for data transmission, telemetry, or for the remote monitoring of some physical condition or process. In particular, it relates to wireless, distributed networks of remote sensors, for use in remote detection and tracking of vehicles or personnel, or for monitoring physical phenomena.

2. Description of the Related Art

Networks which communicate by hard-wired or cable means are common and well known. Examples include local area networks (LAN's), internet, or even telephone networks. In such networks, connections are largely determined by the physical structure of the communication medium, which is typically well known in advance of deployment. For example, in a bus structure like Ethernet, when any computer transmits any other computer on the bus can receive the message. Computers must then take turns using the medium, according to an established protocol.

A wireless network, such as a radio linked network, presents more complex possibilities. A radio network is made up of numerous radio transceivers, referred to as "nodes." Every (useful) node can communicate with at least one other node. However, if the radio range of an individual node is smaller than the size of the entire network, that node can only communicate with a strict subset of the other nodes in the network. The remaining nodes will be outside of communication range. The complete set of information defining which nodes can communicate with which other nodes is referred to as the "topology" of the network.

In general, the topology of a wireless network will be such that each node's transmission is only received by a subset of the other nodes; each node's view of the medium is different. This type of topology is useful as a "multi-hop network" in which the transport of a message from one node to another might take multiple "hops" (i.e., node-to-node relays) to get to its destination. Multiple hop communication is more efficient in use of power as a consequence of the non-linear inverse relationship of radio intensity to distance from the transmitter. For example, in ideal conditions where the radio intensity follows an inverse square law, ten small straight-line hops each of distance d use one-tenth the transmission power of one large hop to ten times d. In actual terrain the attenuation of intensity will generally follow an inverse cubic or higher power function. In that case the multi-hop transmissions result in even greater savings of power as compared to a single hop.

In one simple realization of a wireless network, a node transmits and receives on the same radio frequency or "channel." A fixed carrier frequency is modulated to convey information. (This may be generalized to be a frequency-hopped channel, in which the carrier frequency is pseudo-randomly "hopped," but the receiver hops in synchrony so it is essentially still a single-channel system.) In such a realization a node may either transmit or receive, but not both simultaneously; this is known as a "half-duplex" or "push-to-talk" system. No physical-layer collision detection capability is assumed. In a multi-hop topology, nodes that are sufficiently separated so that they are essentially out of range of one another may successfully communicate simultaneously on the same channel (e.g. A to B at the same time as C to D). This is called "spatial reuse" or "frequency reuse."

Spatial reuse makes more efficient use of the limited radio spectrum available for the network. If a network has, for example, 100 nodes, and each node has range covering the entire network, 100 channels are necessary to avoid interference by simultaneous transmissions between nodes. In contrast, if the nodes have very short range, so that each node can only hear 2 other nodes, many widely separated nodes can simultaneously use the same channels and it may be possible to completely connect the network, without interference, with only four channels. A familiar example occurs in FM radio broadcasting: the same or overlapping frequencies are allocated by the FCC to different stations in widely separated cities; the limited range of each station prevents interference. More generally, the channels may be time slots, as in time domain multiple access (TDMA), or frequency bands, as in frequency domain multiple access (FDMA). In either case, spatial reuse results in more efficient use of bandwidth. However, in order to allocate channels or schedule transmissions it is necessary to know which nodes are within range of one another sufficiently to interfere with one another (the "interference topology" of the network).

Particular applications, for example networks of short range sensors, may have large numbers of nodes (over a thousand) with very limited transmission range, so efficient low power communication requires multihop routing of messages, with some form of channel reuse. Efficient communication thus requires some method of learning the topology of the network where the topology is initially at least partially unknown: for example, a network of wireless sensors may be placed randomly, by dropping them from an aircraft, or some nodes in a previously characterized network may have moved. Once the topology is known, communications can be scheduled so that channels can be reused by nodes out of range of one another.

It is often desirable to learn the topology of a network in a distributed manner. A topology learning procedure can be called "distributed" if it operates in a decentralized manner, impacting only that region of the network that is affected, without the necessity of a central controller. Networks employing such procedures are self-organizing. Other methods of topology determination are possible which operate from a central processing location, but only if relatively high levels of electrical and computational power are provided. These methods tend to be easily jammed, and easily and completely disabled by hostile action or by accidental component failure; the application of such methods to large networks with very numerous nodes depends upon the central processing location and capacity, and may be limited.

Prior methods for learning the topology of a wireless network in a distributed manner suffer from important disadvantages. One such method is described by Ephremides in "A Design Concept for Reliable Mobile Radio Networks with Frequency Hopping Signaling," *Proceedings of the IEEE*, Vol. 75, No. 1, pp. 56–73 (1987). The method requires allocating a block of N slots in a TDMA frame, where N is the maximum total number of nodes in the whole network. Each node is preassigned a specific time slot for transmission, at least during the organization period. The assigned node uses this slot to transmit its understanding of what other nodes it can receive, so that all nodes eventually (say within 2N slots) determine the total topology. There are a number of shortcomings to this approach. It requires that the upper bound N be known, and that unique identification numbers be assigned to all nodes. An even more serious disadvantage is that the organization takes a long time when the number of nodes is large. The method disclosed by Ephremides has utility for networks of less than 100 nodes, but it is not practical for larger networks. This limitation results because the method uses one global time slot (channel) for each node during organization. Thus, networks with large numbers of nodes require many time slots in each time frame, making organization slow. This method is useful in networks with small numbers of highly mobile nodes. It may also be used to "boot up" a set of nodes to initialize a network. However, it is not efficient for large networks in which the nodes are essentially stationary (during some time period). Addition of new nodes is limited, because the total number of nodes is limited to N (the number of timeslots initially allocated).

Another prior method of topology learning, in which the nodes initially communicate a synchronously using a random access technique, is described in A. Bhatnagar, "Layer Net: A New Self-Organizing Network Protocol," *IEEE Military Communications Conference Record*, Vol. 2, pp. 845–49 (1990). This technique requires some means of collision detection and does not provide bounded latency (the maximum time required for organization cannot be predicted). It does not take full advantage of any node location or range method which may be available. The asynchronous mode requires many node receivers to be enabled simultaneously for long periods, increasing power consumption. This method does not consider cases where the interference range of a transmitter is larger than its effective communication range: it requires that if two nodes cannot talk to each other they cannot interfere with each other. Perhaps most serious, the Layer Net Protocol does not necessarily discover all possible links in the network topology.

SUMMARY OF THE INVENTION

This invention provides a more efficient topology learning procedure for wireless networks which operates in a distributed, self-organizing fashion. The topology learning procedure is "distributed" in that it operates in a decentralized manner impacting only that region of the network that is affected, without the necessity of a central controller. It requires a smaller number of time slots in a TDMA scheme for organization than prior systems, the required number being on the order of the maximum degree of a node (the number of nodes to which a node may connect) rather than the total number of nodes in the network. The invention is therefore fast and scalable, with no inherent limit on the size of the network. It also provides a way to add nodes to, or delete nodes from, an existing wireless network.

An advantage of the invention is that it enables the network to self-organize very efficiently, conserving both power and time (or frequency) resources. It is thus very advantageous for a network of low power wireless nodes in which many of the nodes have a limited power source (such as a battery or a solar powered source). Such a network can be used, for example, for perimeter security, personnel detection and tracking, vehicular detection and tracking, or condition based monitoring and control of industrial processes. The "nodes" in these applications would be sensing devices equipped with wireless transceivers for communication. The invention could also be used in a communication network; the nodes would then be transceivers or repeaters.

The invention aims at making maximum spatial reuse of channels (typically TDMA time slots) by identifying for each node two sets of neighbor nodes: (1) a set of communicating neighbors, and (2) a set of interfering neighbors. A "communicating neighbor" for a given node n is any node within reliable communicating range of n. An "interfering neighbor" for any given node n is any node which is within a (larger) range in which transmissions from the "interfering neighbor" may interfere with communications between n and its communicating neighbors The invention typically begins with an (assumed) prior existing network of member nodes with known locations, typically much smaller than the network to be organized. It is also preferable that the maximum communication and maximum interference ranges of all nodes be approximately known in advance (as by direct measurement). The startup network may be one node, but the method will perform better with a larger number of startup member nodes. One of the startup member nodes (the "inviting node") transmits an invitation for a new node (with location unknown) to join the network. If a new node responds to the transmitted invitation, the inviting node, based on the known maximum communication ranges of both the inviting and new nodes, calculates the region in which the new node must be located (within range of the inviting node). It then identifies the member nodes (with known locations) which are within communication range of the region within which the new node must be located. These member nodes are potentially communicating neighbors of the new node, but some may not actually be communicating neighbors because it is not known precisely where within the identified region the new node is actually located, and because the terrain or medium may be inhomogeneous and/or anisotropic, affecting transmissions in local ways. Next, the set of member nodes (known locations) which might be in interference range is identified in a similar fashion; some may not actually be in interference range, depending on the actual location of the new node.

The inviting node and the new node then determine their distance from one another by one of various ranging methods. The inviting node uses the distance information to refine the identification of the sets of communicating neighbors and interfering neighbors of the new node.

Next the inviting node determines a transmission schedule which will allow the new node to determine more accurately its own set of communicating neighbors. The schedule permits the new node to transmit to each potential communicating neighbor and each potential communicating neighbor to transmit to the new node. After the schedule is executed, the new node further restricts the potential set of communicating neighbors based upon the results of the trial transmissions. By a ranging procedure with the newly discovered communicating neighbors, the new node can calculate an improved estimate of its own location.

Once the new node's location has been resolved (to whatever degree possible) the interfering neighbors of the new node may be better identified. A schedule of transmissions is then developed and executed to further identify the interfering neighbors of the new node.

After the communicating neighbors and the interfering neighbors of the new node have been identified, the information identifying both sets of neighbors and the new node are disseminated, at least to the locally affected nodes, for incorporation into the communication and routing schedule. The new node also informs the inviting node about its characteristics and traffic: whether it is a user node, has urgent data, or other important information. The inviting node communicates this information to the locally affected nodes as well. The complete topological effects of the new node on the network are then known. The new node is similarly informed of the local network traffic, routing, and communication schedule. The new node is now a member of the network, and may issue invitations to other new nodes. The entire process may then be repeated until all of the nodes within communication range of any node are incorporated into the network and the topology is completely learned. The information characterizing the topology can then be used to develop an efficient schedule of communications for the network.

The invention is particularly advantageous for a network of very low power, radio linked nodes with distributed, on-node programmability and signal processing capability. A wireless integrated network of sensors would be a likely application. Low power, TDMA radio communication is an efficient method of communication for such a network as it allows the nodes to conserve power in an off state during some of the time slots. The topological information produced by the invention enables the network to schedule TDMA multihop transmissions in a very efficient manner and requires very little prior knowledge of the node locations. It also has the advantages of being scalable and distributed. It can be executed from any node and from multiple (out of range) nodes simultaneously. It is thus resilient and can easily tolerate the destruction or loss of some nodes.

DETAILED DESCRIPTION OF THE INVENTION

Figure 1:
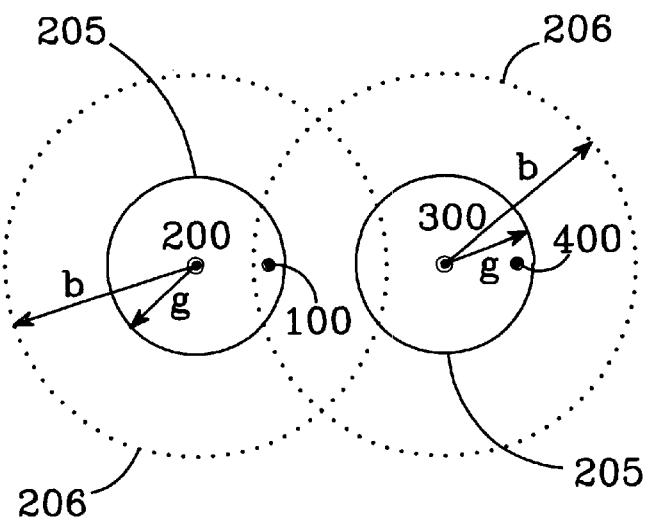
FIG. 1 is diagram symbolically illustrating overlapping communication ranges of four wireless communicating nodes.

The invention is a method and apparatus for learning the topology of a wireless communicating network. It provides the information required to efficiently schedule multihop wireless communications with spatial reuse of channels.

The invention will be described in the context of a network of small electronic devices, each containing a wireless transceiver and able to transmit, receive and relay data. Each of these small devices, hereinafter referred to as "nodes," preferably includes a sensor or sensors, control circuitry, a signal processor and an RF transceiver. In addition, the nodes will most preferably include an apparatus for determining inter-nodal range, which might include an ultrasonic transducer. The sensors may detect vibration, seismic signals, infrared signals, magnetic signals, sound or any other detectable physical phenomena. Although for convenience we consider radio as a familiar medium of communication, other wireless media such as ultrasonic, infrared or optical could be used. A network of such nodes can be placed by various methods including dropping them from an aircraft, dropping them from a motor vehicle, or manually placing them using personnel. This description also assumes for convenience a fixed carrier frequency radio channel that is modulated to convey information (although the method may be generalized to frequency hopped or other communication channels).

The method of the invention is first described; the description of a node apparatus which can be used in the invention follows.

The Method of Network Self-Organization

For each deployed node, there is a maximum communication range g in the terrain where it is placed, and at a given power level. The range g is preferably determined beforehand by empirical testing. Similarly, it is preferable that a maximum interference range b, within which a transmission may interfere with other transmissions on the same channel, has been previously determined. One can then define for each node two sets of neighbor nodes: (1) a set of communicating neighbors, and (2) a set of interfering neighbors. A "communicating neighbor" for a given node n is any node capable of reliable communications with n. An "interfering neighbor" for any given node n is any node which cannot communicate reliably with n but whose transmissions may interfere with communications between n and its communicating neighbors. The goal of the invention is to determine—for each node—its communicating neighbors and its interfering neighbors. This information completely defines the network topology and is sufficient to enable efficient scheduling of TDMA, FDMA, code division multiple access (CDMA) or otherwise organized communications. The topology can be informally thought of as defining "who can talk directly to whom" and "who can't talk at the same time." More formally, the "topology" of a network can be defined as the complete information identifying the communicating and interfering neighbors for each node of the network.

In one method of scheduling (TDMA), the nodes which are members of the same network operate in synchronous, periodic time frames. Each time frame is divided into multiple time slots, each of shorter duration than the frame. Different nodes in the same region are scheduled to transmit in different assigned time slots. Different nodes which have completely non-overlapping interference regions, however, can be scheduled to transmit in the same time slots (simultaneously) without collision of data. In a power-limited application, TDMA offers advantages over random access because power can be conserved by turning off transmitters and receivers during idle time slots.

FIG. 1 illustrates communicating neighbor nodes and interfering neighbor nodes. In the figure, nodes 200 and 300 are transmitting, and nodes 100 and 400 are receiving. For ease in describing and illustrating the concepts, it is assumed in FIG. 1 that any node within range g is a communicating neighbor, and any node between range g and b is an interfering neighbor. If a receiving node lies within a range g of the transmitting node (shown by the solid circles 205, centered on 200 and 300), then successful communication with the transmitting node can occur: the receiving node is a communicating neighbor of the transmitting node. However, if the receiving node is farther than g away but within interference range b of the transmitting node (shown by the dotted circles 206, centered on 200 and 300) then it is an "interfering neighbor." In FIG. 1, node 200 is a communicating neighbor of node 100, and node 300 is an interfering neighbor of node 100. Node 400 is a communicating neighbor of node 300, but node 400 is out of interference range with node 200. Thus if node 200 and node 300 simultaneously transmit while nodes 100 and 400 receive, node 300's transmission will be successfully received by node 400. Node 200's transmission will not be accurately received by node 100, however, because of interference from node 300.

Figure 2:
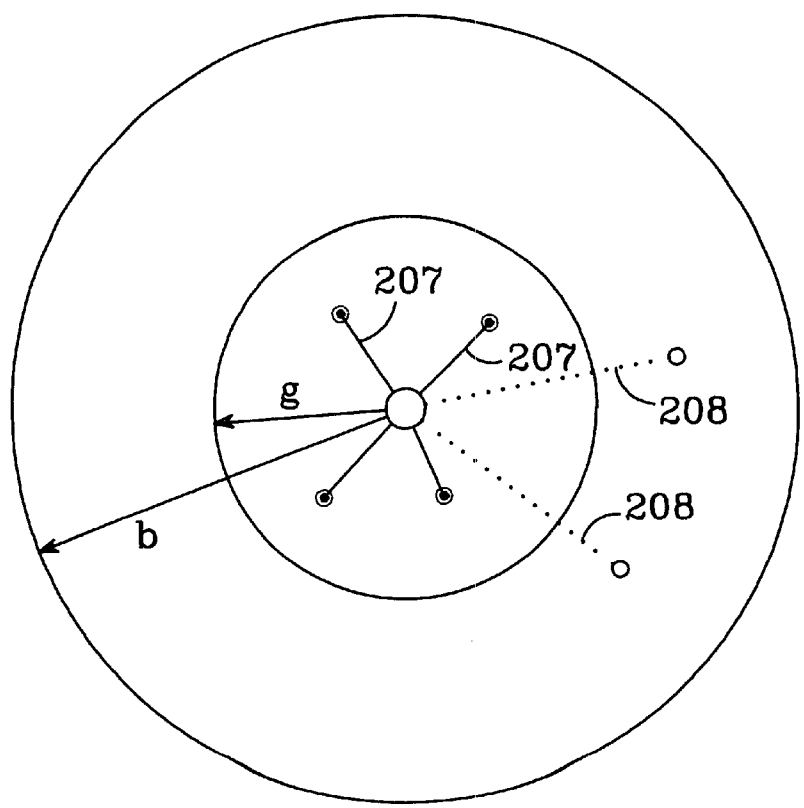
FIG. 2 is a diagram illustrating neighbors of a given node.

The relationships between nodes can also be illustrated as in FIG. 2. The topology is represented by the links in the graph. Communicating neighbors are linked by solid lines 207; interfering neighbors are linked by dotted lines 208.

It should be understood that the regions designated by circle such as 205 and 206, above, are idealized approximations based on assumptions of ideal terrain. Actual terrain in general will include significant, irregular obstacles such as rocks, hills, trees, and other features, which cause the actual regions of interference and communication to be irregular instead of circular (or spherical in three-dimensions). Nevertheless, the idealized approximations (circular regions) are useful constructs in that they represent maximum regions of communication or interference, as the case may be. These approximations should preferably be estimated or measured before node deployment, to obtain estimates of g and b for use in the method of the invention.

Figure 3:
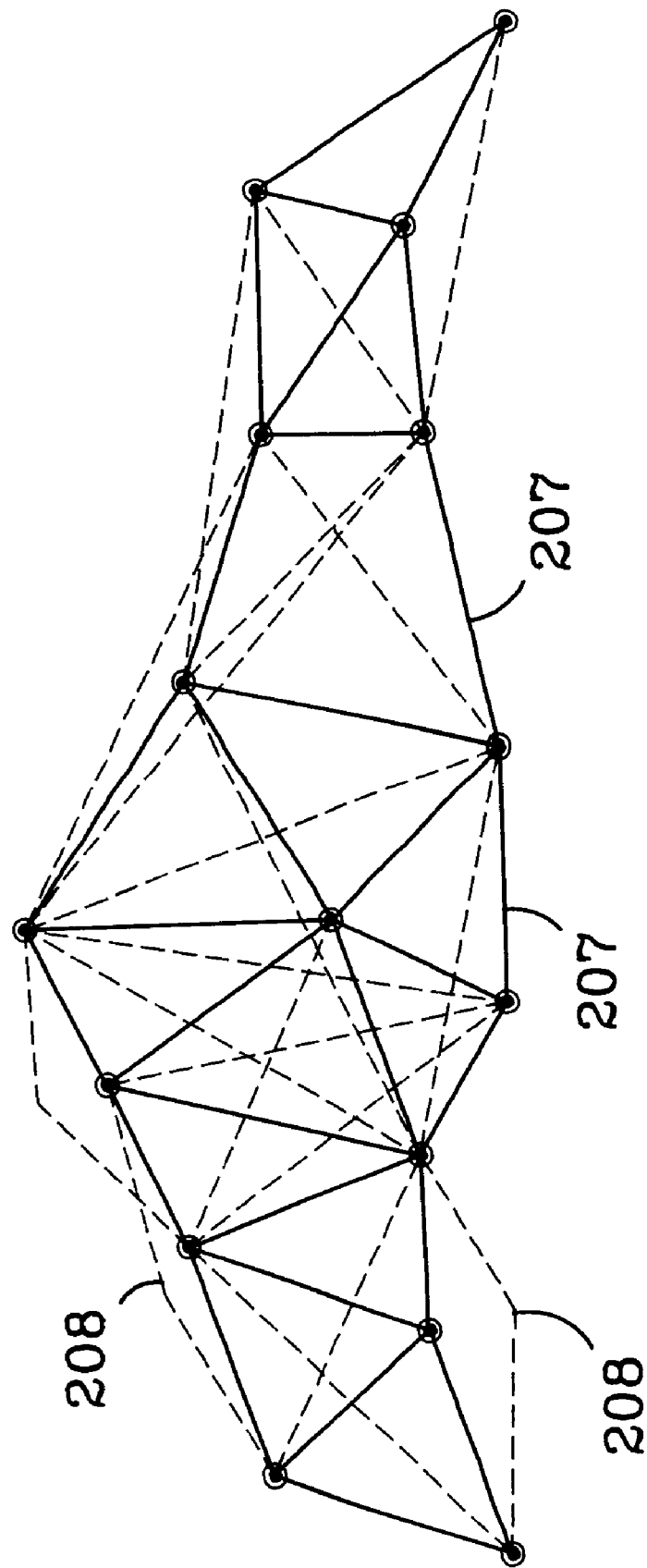
FIG. 3 is a diagram illustrating one example of a network topology.

FIG. 3 shows a larger example of a network with the topology indicated by dotted and solid lines in the same manner as in FIG. 2. In certain cases it may be possible that the links are unidirectional: 100 may be able to hear 200 but 200 cannot hear 100, due to, say, propagation effects or variations in hardware. The topology learning procedure of the invention also applies in such a case and provides a method of learning the topology of the directed links.

When the network is initially deployed, say by dropping the nodes from an aircraft, the nodes may be more or less randomly placed. It is desirable for the invention that the relative locations of some nodes (at least one) be known initially. This can be guaranteed by various methods, including placing some nodes in known locations, providing some nodes with a locating device such a global positioning system (GPS), or visually inspecting to locate some nodes. The invention can be used to add a new node to an existing operating network, or it may be used to create a network from multiple individual unorganized nodes. In order to best illustrate all the steps of the method, it is convenient to first consider the invention in the context of adding a node to an existing operating network. The special case in which the invention is used to create a network from previously disorganized nodes can then be easily illustrated.

To illustrate the use of the invention to add a node to a network, we assume a "startup network," which is an existing communicating network of nodes organized to allow communication (by multi-hop relay if necessary) between any two members of the network ("member nodes"). The startup network may have been organized by conventional methods or by the invention, as described below. It is most convenient if the startup network includes nodes with initially known relative locations. Each member node preferably "knows" (has stored data regarding) the relative locations of all other member nodes within its maximum interference range b. As discussed more fully below, each node will preferably include a microprocessor which can store information, including the location information. This information may be pre-programmed or acquired during the startup configuration, then distributed among the nodes by wireless communication. Given the startup network as described, the invention provides a way to add one or more new nodes to the network and to learn the resulting topology so that communications may be scheduled for the resulting larger network. As part of the startup network's normal operation, the network should preferably have the ability to solicit, repeatedly, the addition of new nodes, by transmitting an invitation. Preferably the invitation will be repeated quasi-periodically, with period of p plus some psuedo-random delay ("jitter"). The jitter is added to prevent two accidentally synchronous nodes from repeatedly transmitting the invitation simultaneously, thereby missing each other's transmissions. This insures that by receiving for at least some time interval, longer than p, the new node will receive the invitation. All the member nodes in the network may quasi-periodically issue invitations for a new node to join the network. It is convenient if member nodes within g+b of each other do not issue such invitations simultaneously, to avoid interference. All of the non-member nodes not yet part of the network are pre-programmed to occasionally listen (turn their receiver on) for some predetermined number of periods p for invitations. Thereafter, the invited new node is brought into synchrony with the rest of the network so that the new node uses the same defined TDMA time frame as the member nodes of the network.

Figure 4:
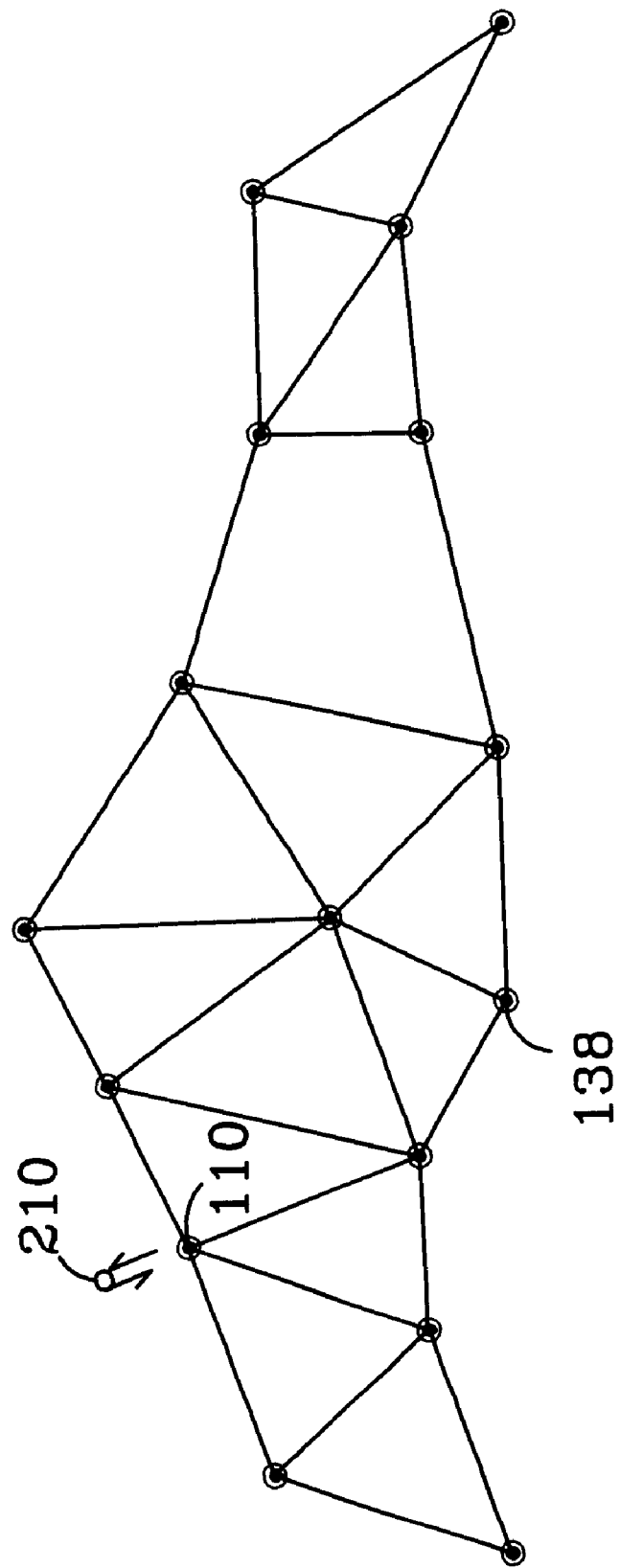
FIG. 4 is a diagram illustrating a new node responding to an invitation from an existing network, in accordance with the invention.

When a member node (the "inviting node") issues an invitation which a new node receives, the new node responds. This indicates to both the inviting and the new node that they are communicating neighbors. FIG. 4 shows a new node 210 responding to an invitation from inviting node 110, with the other member nodes (such as 138) of the existing network symbolized by linked small circles.

Figure 5:
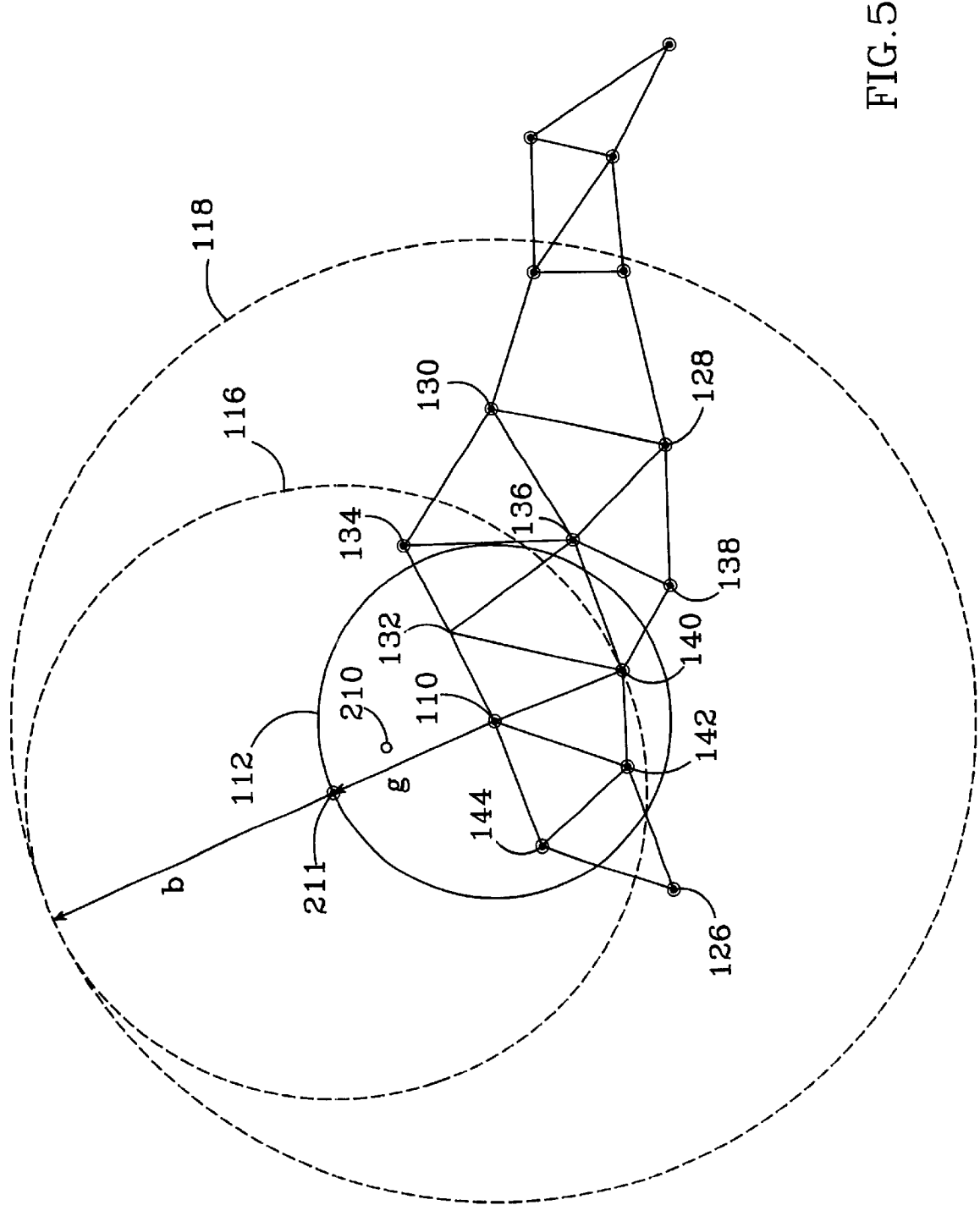
FIG. 5 is a diagram illustrating the potential interference region of the new node of FIG. 4.

Before transmitting the invitation, the network schedules the communications so that no conflicts will occur. Preferably the schedule is computed by the inviting node. Even without knowing the precise location of the new node, the inviting node 110 can put an outer boundary on the interference neighborhood which might be affected by the new node. As shown in FIG. 5, this outer boundary is the circle 118, centered on 110 and having a radius of g+b, which can be demonstrated as follows: the new node 210 must be located within communication range g of inviting node 110 if it is to receive the invitation and respond. Therefore, 210 lies somewhere within circle 112 of radius g and centered on 110. The new node 210 is known to have interference range b. Its actual interference region is, therefore, a region within some circle of radius b with a center at an unknown location within circle 112. Although the actual interference region will in general be irregularly shaped, depending on local signal propagation characteristics, some circular region of radius b will certainly include the actual region, since b is the maximum interference range. One such hypothetical circle is shown as 116 in FIG. 5, centered at an arbitrary point 211 on the extreme periphery of 112. Because it is not yet known which point within circle 112 is the actual location of new node 210, we cannot know which circle, with center within circle 112, includes the actual interference region of new node 210. We therefore consider the union of all such circles. We define the "potential interference region" as the union of all possible regions bounded by circles of radius b with centers located anywhere within circle 112. The union of the regions within all such circles is itself a circular region bounded by 118, centered on inviting node 110 and having a radius g+b, as shown in FIG. 5. No point outside of this region bounded by circle 118 could possibly be in interference range of any new node which can receive from node 110.

Based on knowledge of b and g (which are preferably previously determined and programmed into a node), communications are scheduled, preferably by computation on the inviting node, to avoid conflicts during the invitation and response. In a simple method of scheduling, it is sufficient to schedule the invitation and response so that no member node within circle 118 is scheduled to transmit or receive at the same time as the invitation and expected response from a new node. In an alternative method, a schedule is formed consistent with the following constraints: (1) no node within b+g of the inviting node will transmit during the invitation, (2) no node within b of the inviting node will receive during the invitation, (3) no node within b+g of the inviting node will receive during response, and (4) no node within b of the inviting node will transmit during the response. The alternative method may in some cases allow more nodes to communicate during the invitation/response period, depending on the placements of the nodes.

Figure 6:
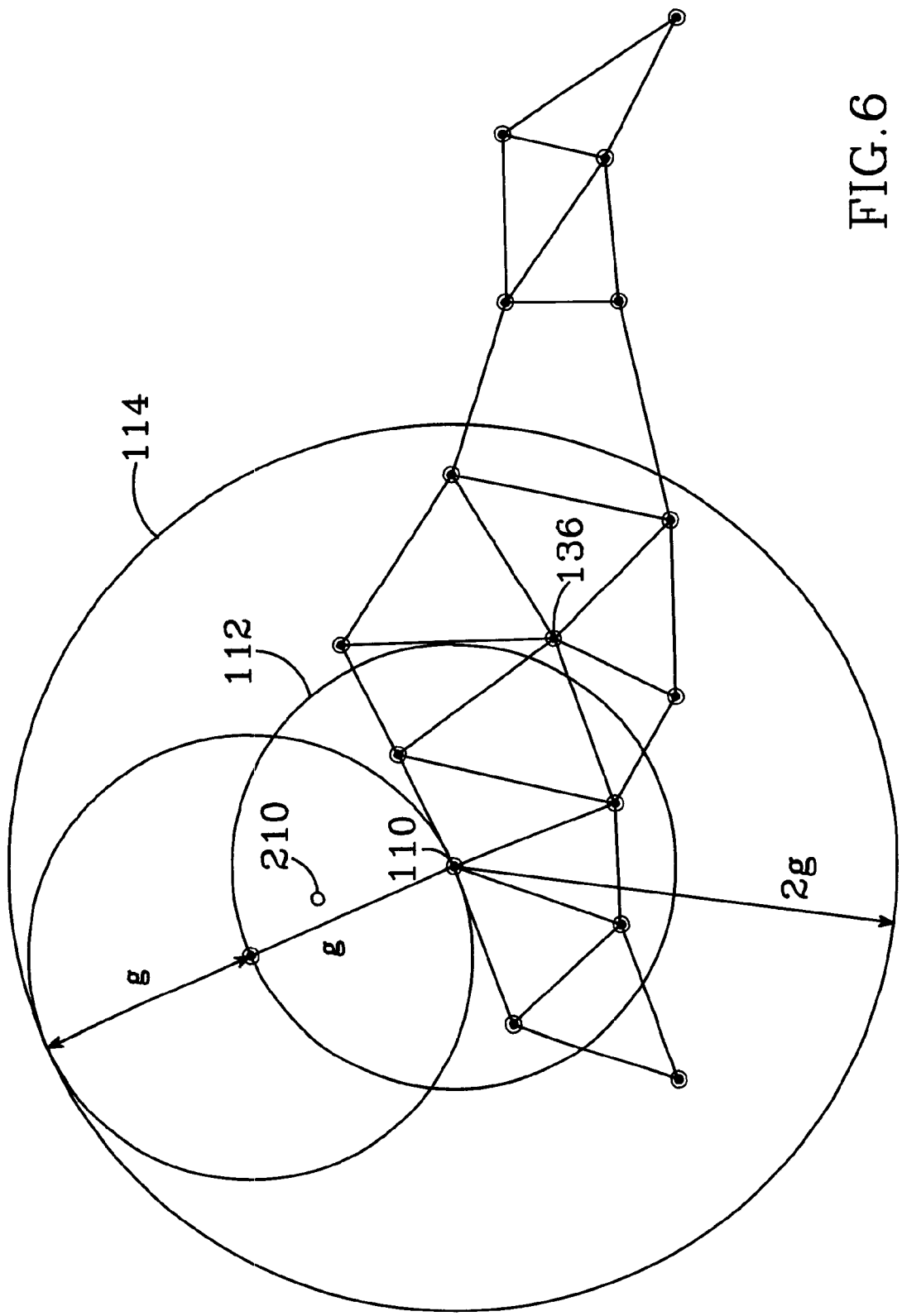
FIG. 6 is a diagram illustrating the potential communication region of the new node of FIG. 4.

Similarly, we can define a "potential communicating neighborhood" for the new node as the largest region within which the new node might (depending on its actual location) have communicating neighbors, given only that the new node is within communicating range g of the inviting node. The outer boundary of the new node's potential communicating neighborhood is calculated (preferably by the inviting node 110) before the invitation is transmitted, as illustrated by FIG. 6. Any new node which can receive the inviting node and respond must be within communication range g (which is predetermined) of the inviting node, shown as circle 112 of radius g and centered on 110. It is not known beforehand exactly where within circle 112 the new node is located. Any other member nodes which might communicate with the new node are within range g of the new node, which is to say within a circle of radius g centered on the (unknown) location of the new node. To obtain the broadest possible region within which a new node might communicate, without exact knowledge of the new node's location, we can take the union of the regions within all the circles of radius g around all the possible locations of the new node. This is the union of the areas within all circles with centers on or inside of circle 112. The union of the interiors of those circles is the set of points within circle 114 of radius 2g and centered on inviting node 110. No matter where the new node is within circle 112, it could not possibly communicate with a member node outside of the resulting circle 114 of radius 2g and centered on 110.

The new node might potentially, if properly located, be able to communicate with some of the nodes within circle 114, but in general it will not be able to communicate with all of them, depending on its actual (as yet undetermined) location and specific local propagation characteristics. As an example, in FIG. 6 new node 210 will not actually be in communication range of member node 136, but without knowing in advance the location of 210 this could not be predicted: some points on or in circle 112 are very close to 136. The area within circle 114 of FIG. 6 is thus identified (by computation on a node) as the "potential communication range" of new node 210, not the actual communication range.

Having identified the potential communication neighborhood and the potential interference neighborhood of the new node, the initial invitation is transmitted according to the appropriate schedule. In a TDMA communication system this would mean that the invitation is transmitted by the inviting node 110 so that the response from the new node occurs in a time slot during which none of the other member nodes within circle 118 are receiving.

Once a new node has been detected, the inviting node and the new node determine their distance d from one another using their ranging capabilities, if any are available. The internodal distance may be determined by various conventional methods, such as by measuring the time of travel of an acoustic, ultrasonic, or RF pulse, or by comparison of RF received signal strength with transmission signal strength. Various means of ranging by radar echoing of RF pulses are known, such as multiple discrete PRF (pulse repetition frequency) ranging, as described in Skolnik, Merrill I., *Radar Handbook*, Mcgraw Hill (1990), Section 17.4. These RF pulse methods are suitable for use with high clock rates and RF frequencies sufficiently high to allow for accurate measurement of short time intervals consistent with the minimum range to be measured. Another ranging method, timing an acoustic or ultrasonic pulse, is better suited to low clock rates and lower RF frequency operation, and is thus more appropriate with low power, lower frequency (less than 1 Ghz) circuitry. One realization of the acoustic or ultrasonic ranging method is described below in connection with the description of the node hardware. In some embodiments the position of each node may be known, for example by global positioning system (GPS) devices provided on the nodes. Range can then be calculated easily from the known node positions. However derived, the ranging information greatly enhances the topology learning process of the invention.

Figure 7:
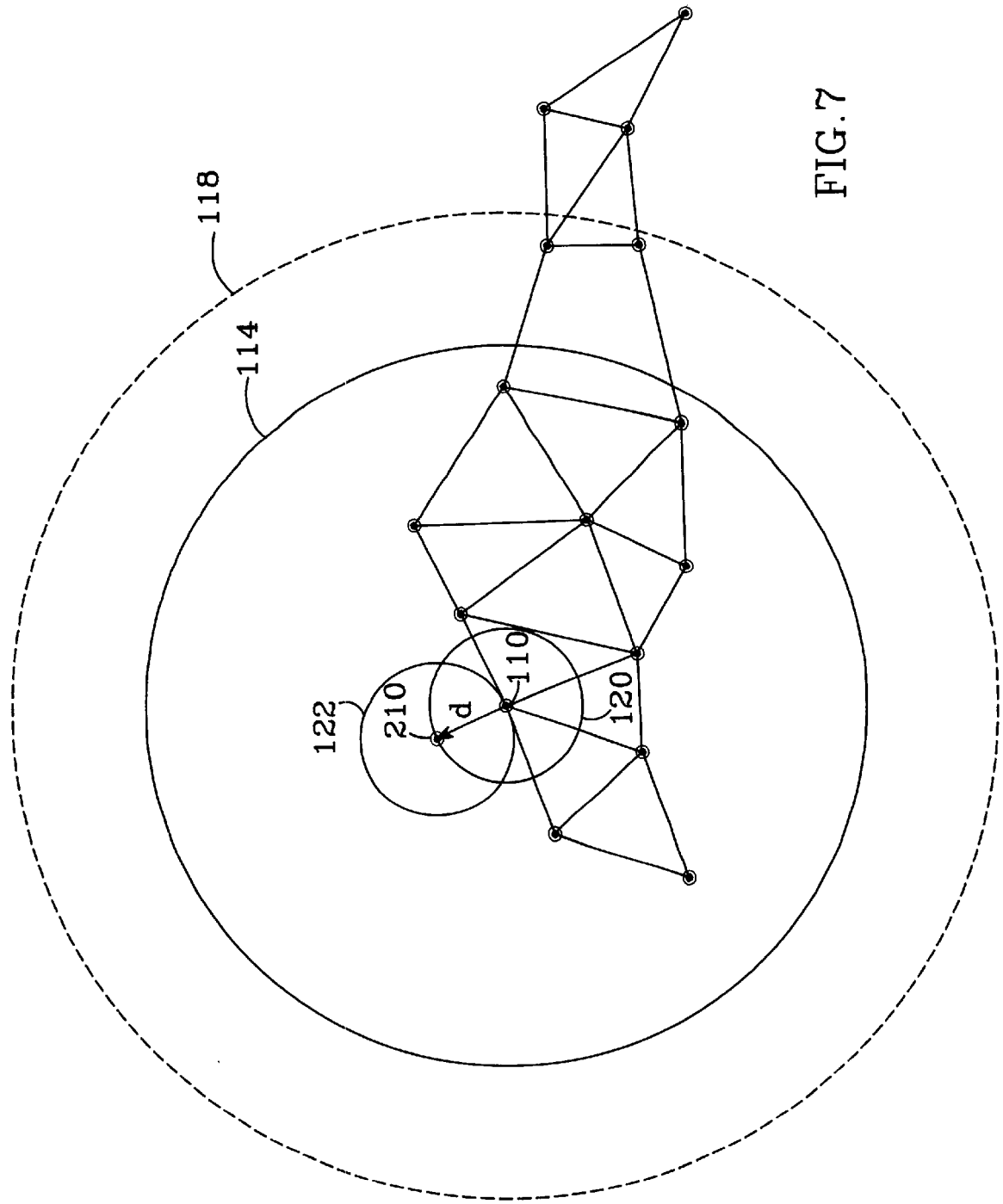
FIG. 7 is a diagram illustrating an inviting node and a new node determining the distance d which separates them.

FIG. 7 illustrates the result of ranging between the new node 210 and the inviting node 110, in the same network example illustrated in FIGS. 3–6. FIG. 7 also shows, for the new node 210, its potential communicating neighborhood 114 and potential interfering neighborhood 118, both circles centered on the inviting node 110. After measuring the range d, the inviting node 110 can determine that the new node lies on the circle 120, of radius d and centered on inviting node 110. The new node 210 can determine that the inviting node lies on circle 122 of radius d and centered on new node 210.

Figure 8:
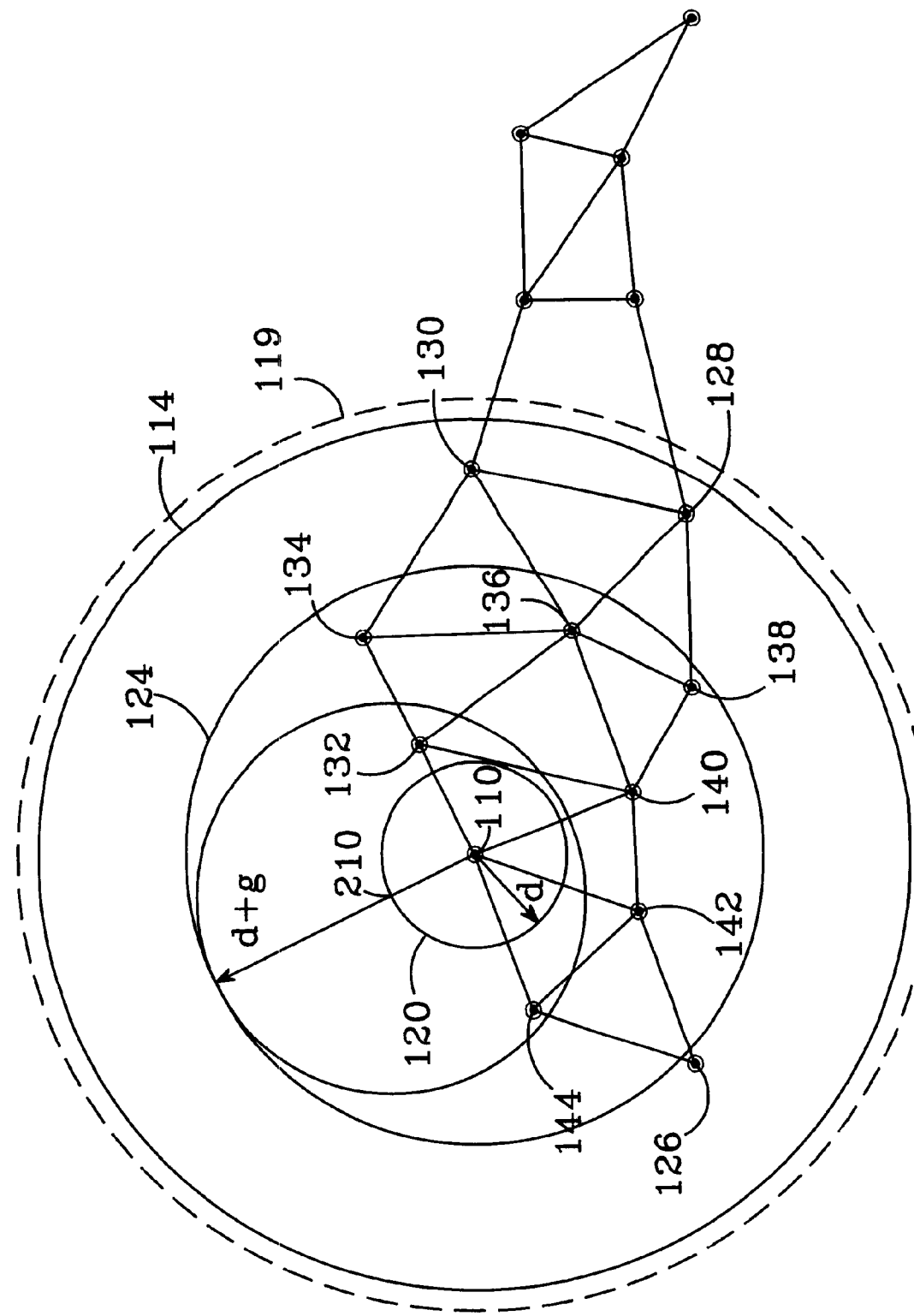
FIG. 8 is a diagram showing the potential regions of communication and interference as restricted after ranging has been performed.

After determining d, the inviting node will improve the calculation of the potential communicating neighborhood and the potential interference neighborhood of the new node 210, as illustrated in FIG. 8. The new node 210 is known of be on circle 120, of radius d, but it is not known where on the circle 120 it lies. Because the new node 210 has a range g, we know that its communicating neighborhood is a region within a circle of radius g, but the center of that circle might lie anywhere on circle 120. Given that uncertainty, we can still define the outer boundary of a potential communicating neighborhood. The potential communicating neighborhood is the union of all the regions bounded by circles centered on 120 and having radii equal to g, which is the area within a circle 124 of radius d+g and centered on inviting node 110. Depending on its actual position on circle 120, The new node 210 might be able to communicate with any node which is within g of any point on the circle 120; it will actually be able to communicate only with nodes within one such circle, the one centered on new node 210's actual location (and then only with those nodes not blocked by local signal propagation effects of terrain).

Using the ranging information d, we have limited the possible area in which the new node might have communicating neighbors to the area within circle 124. Note that this cannot be larger than 114 (radius 2g), the previous estimated region, because d is less than or equal to g. In most cases d will be less than g. By comparing the area within circle 124 with the (known) locations of the member nodes, the set of potential communicating neighbors for new node 210 may be narrowed by excluding nodes outside of circle 124. In the continuing example illustrated in FIG. 8 and preceding figures, three member nodes— 126, 128, and 130— are found to be outside the potential communicating neighborhood for new node 210, bounded by circle 124.

Similarly, the inviting node can use the ranging information d to limit the possible area of interference to the region within a circle 119, centered on 110 and having a radius of d+b as shown on FIG. 8.

Next, the inviting node determines a schedule that will allow the new node 210 to determine its communicating neighbors. It does this by scheduling and executing a transmission from each member node in the (narrowed) potential communicating neighbor set (while the new node is scheduled to receive), and/or scheduling a transmission from the new node while all nodes in the (narrowed) potential communicating neighbor set are scheduled to receive. Both schedules will be required when the network topology is directionally asymmetric. Some transmissions may not be received, indicating that the intended member node is outside of the actual communicating neighborhood of the new node 210. In our example, transmissions from member nodes 132, 134, 136, 138, 140, 142, and 144, within circle 124, will be scheduled, along with the new node 210. Transmissions from member nodes 126, 128, and 130 in our example, determined to be outside circle 124, need not be scheduled.

If ranging fails or is not available, as in an embodiment without ranging capability, the inviting node can schedule the communication probing procedure for all nodes within the (larger) circle 114, centered on inviting node 110 and having radius 2 g. This was our preliminary estimate of the potential communication region, as discussed above. In this case, more transmissions may be required, but the method will still perform and it is not necessary to involve every member node of the network.

Note that power and time (or bandwidth) have been conserved by first narrowing the set of potential communicating neighbors, so that it was not necessary at each step to schedule transmissions to and from every member node, or even to and from all member nodes within 2 g of inviting node 110. By involving fewer nodes, power is saved by scheduling fewer transmissions. Depending on the algorithm used for communication scheduling, a transmission from the new node to multiple member nodes might occur in multiple time slots, with each intended recipient member node set to receive only during its respective assigned slot. In such a schedule, a transmission to multiple recipient member nodes actually requires multiple transmissions, requiring more energy and time for greater numbers of intended recipient nodes. Even if the scheduling algorithm permits a single transmission from the new node to multiple recipient member nodes, the intended recipient nodes must each report back to the inviting node 110 the result of the attempted transmission: reception or none. Reporting back requires at least one transmission per reporting node. Power and time are thus saved by keeping the number of nodes involved low. Power and time are also saved by scheduling fewer test transmissions from the member nodes to the new node. In some hardware implementations, receivers may also be able to conserve additional power by turning off during time slots when no transmission is scheduled. At every step in the method the inviting node 110 calculates a neighborhood and identifies a restricted set of member nodes before scheduling transmissions, if possible narrowing the number of required transmissions. Power is saved by exploiting the fact that calculation consumes much less power than wireless communication.

Figure 9:
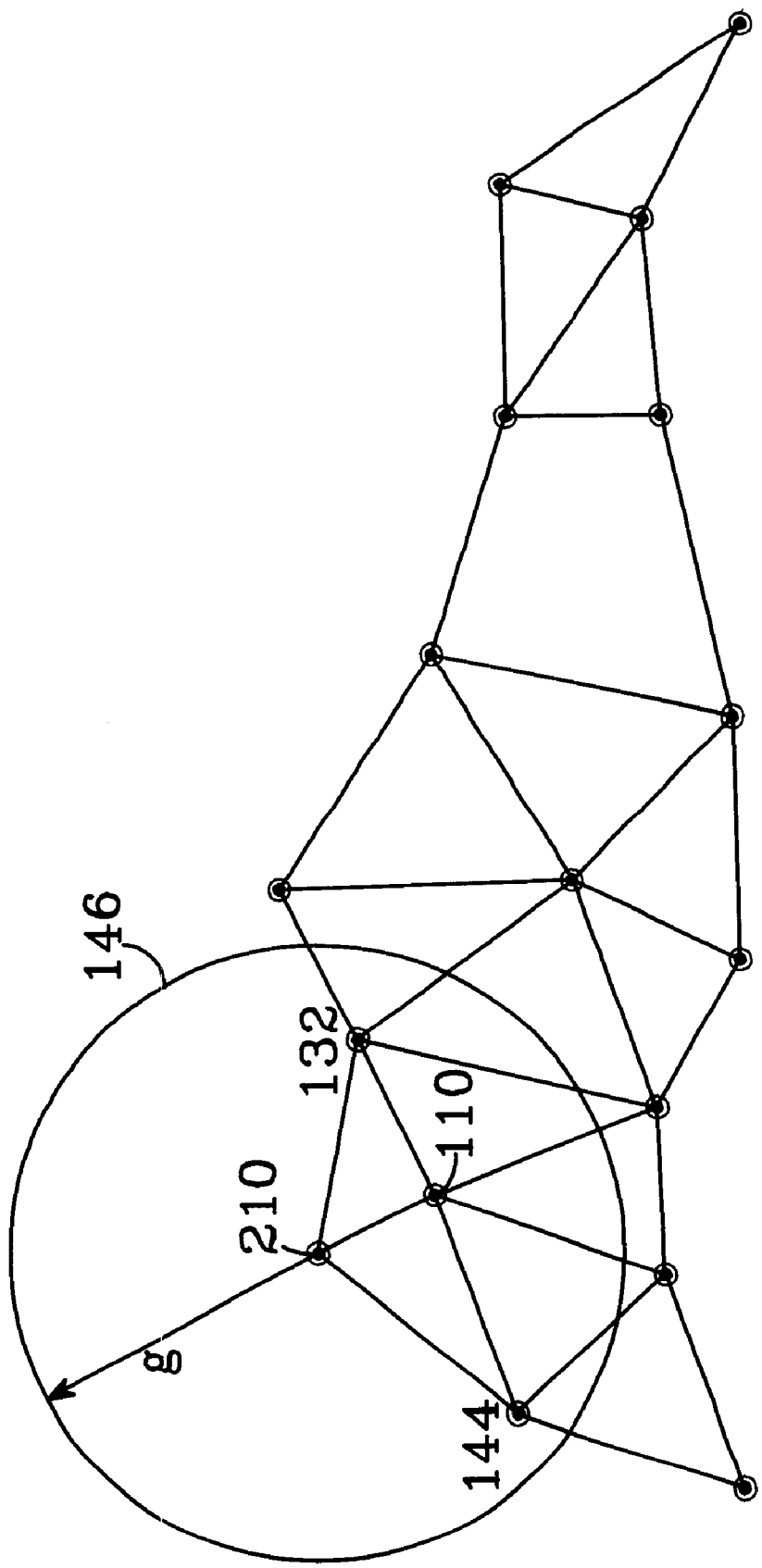
FIG. 9 is a diagram showing the communication neighbors of the new node, as determined by the steps of the invention.

After the schedule of transmissions is distributed to the member nodes involved, it is executed and the results are stored by microprocessors on each member node involved. The set of member nodes which are communicating neighbors of new node 210 are now known exactly. In our example continued in FIG. 9, the new node discovers only two other communicating neighbors, 132 and 144, besides the inviting node 110. Note that the communicating neighbors actually found lie within circle 146 of radius g, centered on new node 210, as they must since g is the maximum communicating range of node 210.

Figure 10:
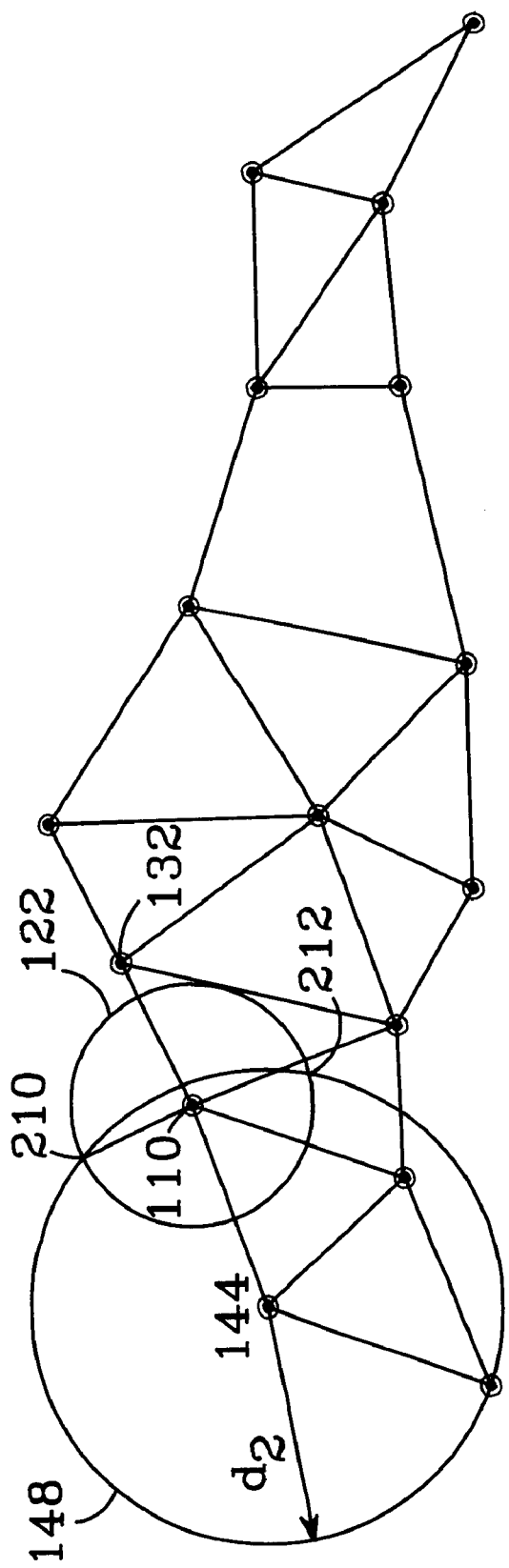
FIG. 10 is a diagram illustrating the method of further locating the new node, and the resulting restriction of the interference region.

Once the new node has determined the set of its communicating neighbors, the calculation of its absolute location may be improved. In an essentially two dimensional network, if no communicating neighbors other than the inviting node are found, then the new node's location is only resolved to being on the circle of radius d from the inviting node (or a sphere in a 3 dimensional network). If one additional communicating neighbor is found, by ranging with the additional communicating neighbor the new node's location may be resolved to one of two points on a surface (or to a circle in 3 dimensional space). This situation is illustrated in FIG. 10. After ranging with member node 144 and with inviting node 110, it is known that 210 lies on a circle 122 with radius d centered on 110, and on another circle 148 with radius $d_2$ and centered on member node 144. This information restricts the possible locations of the new node to the two points where the circles 122 and 148 intersect. It must be at either the location of 210 (its actual correct location) or at the other intersection 212 of circles 148 and 122. Ranging with a third node, say 132, will resolve the location to one point at the actual location of new node 210 (except for the special case when the member nodes 132 and 144 and inviting node 110 all lie on the same line). On a surface, ranging with 3 non-collinear points is sufficient to resolve location to a point, as is well known to navigators. Knowledge of the connectivity may also be used to assist in resolving locations; however, radio propagation may be inhomogeneous, complicating the problem.

Figure 11:
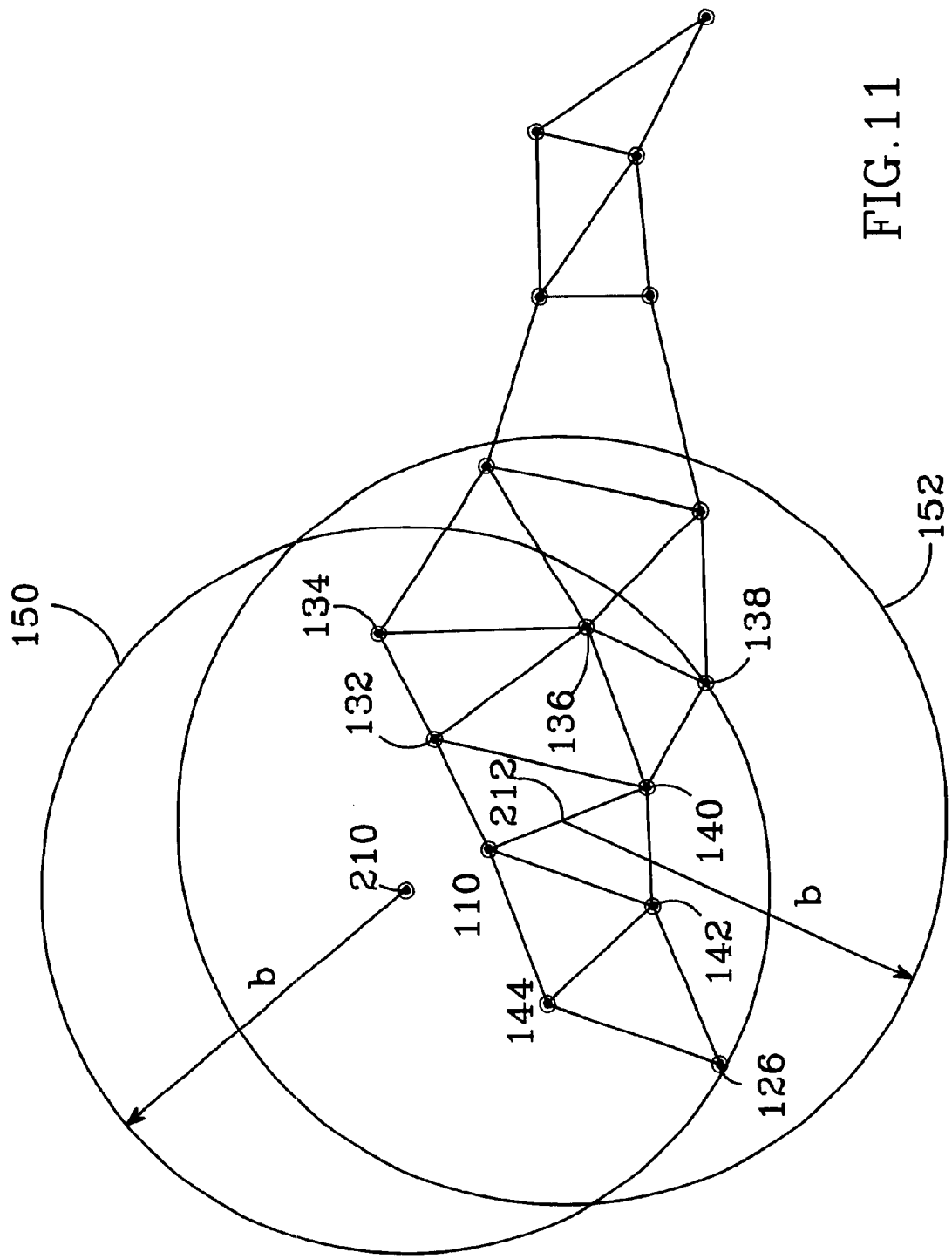
FIG. 11 is a diagram of the interfering neighbor nodes of the new node.

Once the new node 210's location has been further resolved, the new node's set of interfering neighbor member nodes may be restricted by comparing the known locations of the member nodes with the improved estimate of the new node's location. The calculations to compare the member node's locations to the interference neighborhood of the new node 210 can be performed by a microprocessor at either the new node 210 or the inviting node, and the resulting information can be used to compute an improved communication schedule in which the interfering neighbors, of new node 210 will not transmit at the same time as the new node 210. This restriction is illustrated in FIG. 11, where the step of ranging with node 132 has been neglected in order to better illustrate the more general case in which the position of the new node has not been precisely located, but has been narrowed to two candidate points. The interfering neighbors must lie within the union of the two circles 150 (centered on the possible new node location 210 with radius b) and 152 (centered on the other possible new node location 212 with radius b).

Next, a schedule is developed to further restrict the set of member nodes which are interference neighbors of the new node 210. If the new node has not been precisely located, the potential region of interference has not been completely limited to a circle of radius b (circle 150 in the example of FIG. 11). Even if the new node has been precisely located, terrain effects may modify the interference so that the interference neighborhood may not be identical to that calculated. Different methods can be used to identify the actual interference neighborhood. For example, each member node in the potential interfering neighborhood, and a known communicating neighbor could transmit simultaneously and the new node could determine whether it can still receive the communicating neighbor's transmission reliably. These activities can conveniently be controlled from the microprocessor at the inviting node, and the instructions relayed through the network to the member nodes involved. Another method might use a physical measurement at the new node's receiver to determine interference levels, as by measuring received signal strength of scheduled transmissions from each member node in the potential interference neighborhood. Alternatively, the microprocessor at the inviting node can request each potential interfering member neighbor to transmit a test message at a higher power level than normal to characterize the situation. Whichever method is used, it is an advantage of the invention that the set of potential interfering nodes has been previously restricted in stages, requiring fewer transmissions and less energy consumption than simply transmitting to and from every member node. Furthermore, the technique is scalable: no matter now many nodes are in the network, assuming there is a maximum spatial density, the time and effort to incorporate a new node is bounded.

FIG. 11 illustrates that after executing the interference probing schedule in our example the new node 210 discovers it has only seven interference neighbors (of the nine possible before probing), all within circle 150 of radius b and centered on node 210. The interference neighbors found are: 134, 136, 138, 140, 142, 126, and 144.

The topology of the new node 210 is now completely learned and the effects that the new node has on the network are calculated and distributed for incorporation into the network's communication scheduling protocol. The new node may communicate with any of its communicating neighbors, but may not receive at the same time that an interfering neighbor (which is not a communicating neighbor) is transmitting. Neither can the new node transmit at the same time that an interfering neighbor (which is not a communicating neighbor) is receiving (assuming transmit/receive symmetry in the medium. Otherwise, probing must be bi-directional to determine the interference topology completely). This information enables scheduling of transmissions for multihop communications across the network, preferably in a TDMA protocol. TDMA is advantageous for low power networks in which the nodes have very limited power supplies, because transmitters and receivers not active during a time slot may be turned off temporarily, conserving energy. A node may still employ spread-spectrum or frequency hopping techniques within its TDMA time slot, and it may be desirable to employ such a technique.

After the topological effects of the new node are learned, the acquired information (the identity, location, and the communication and interference neighbors of the new node) is disseminated to the network, at least locally as needed to schedule communications. The communication protocol of the network, controlled by the individual pre-programmed microprocessors on the nodes, should provide for the dissemination of relevant topological information so that information may be routed within the network and can be directed to and from user interface nodes (nodes which are accessible to a user, for data output or input). Similarly, the new node receives the routing and other information from the network and stores the information in its microprocessor. The new node 210 is now a member node of the network. That node may in turn issue invitations for other new nodes to join. The new node characterization method is then repeated from each member node and for each new node. The organization of the network propagates outward from the startup network in a distributed manner organizing the complete network. Even after the complete network is formed, invitations continue to be issued, so that the network can add new nodes if any are provided at a later time (for instance, by a user's action).

In the preceding discussion, except where indicated we have considered the invention in the context of a two dimensional network, where all of the nodes lie on a surface. However, the invention is not limited to nodes on a surface. In a three dimensional network, the communication range and interference range will define regions in three-space, and the same procedure can be applied. Nor is the method is limited to use with non-directional antennas. In a network with directional antennas, the various regions considered will become irregular regions in the plane (two dimensions) or in three space (in three dimensions). Except for the complexity of calculation introduced by irregular geometry, the method of the invention will remain essentially the same.

Figure 12A:
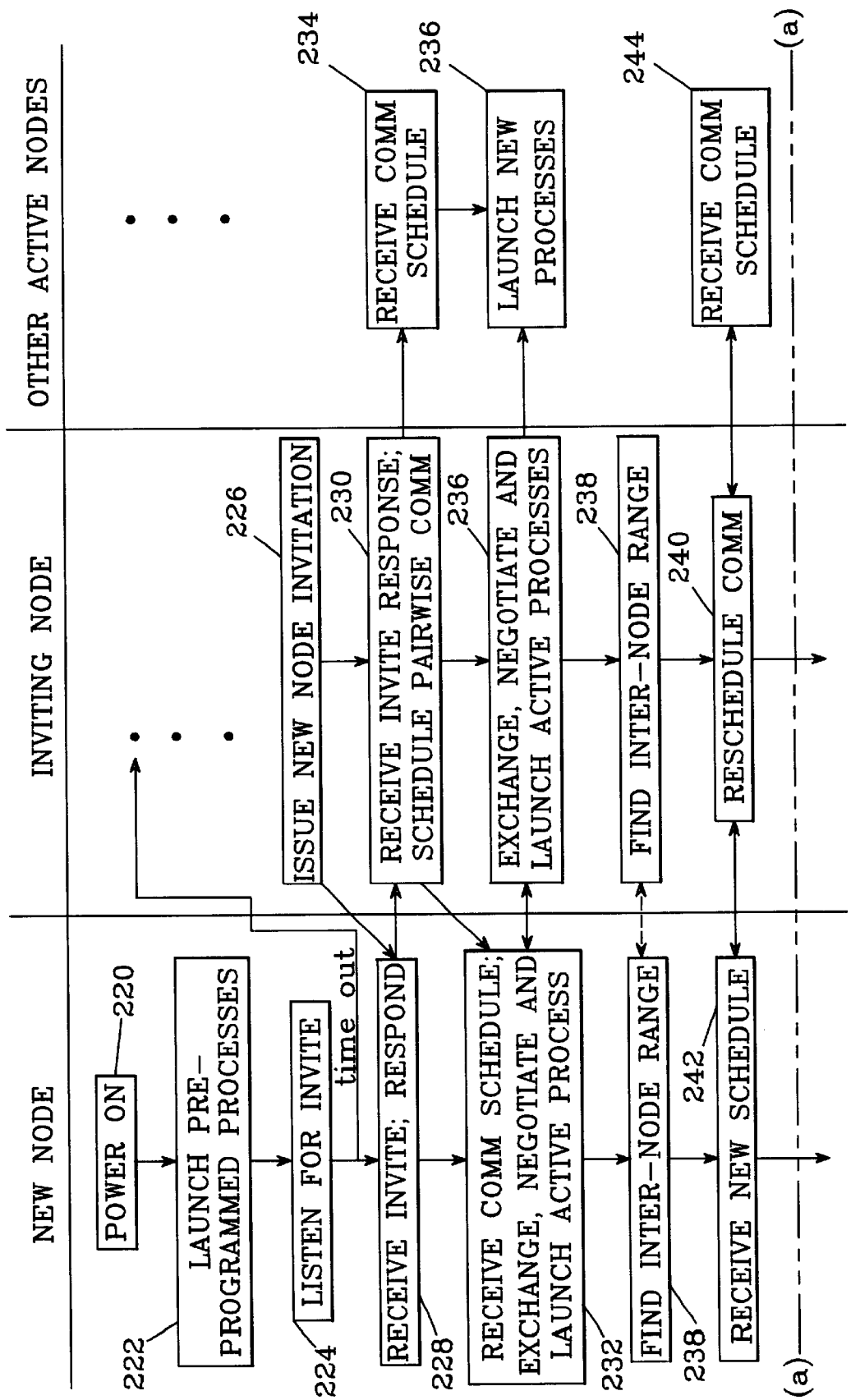
FIG. 12a–12d is a flow chart of the preferred method used by the invention, broken by cut lines a–c and reading from the top of 12a to the bottom of 12d.
Figure 12B:
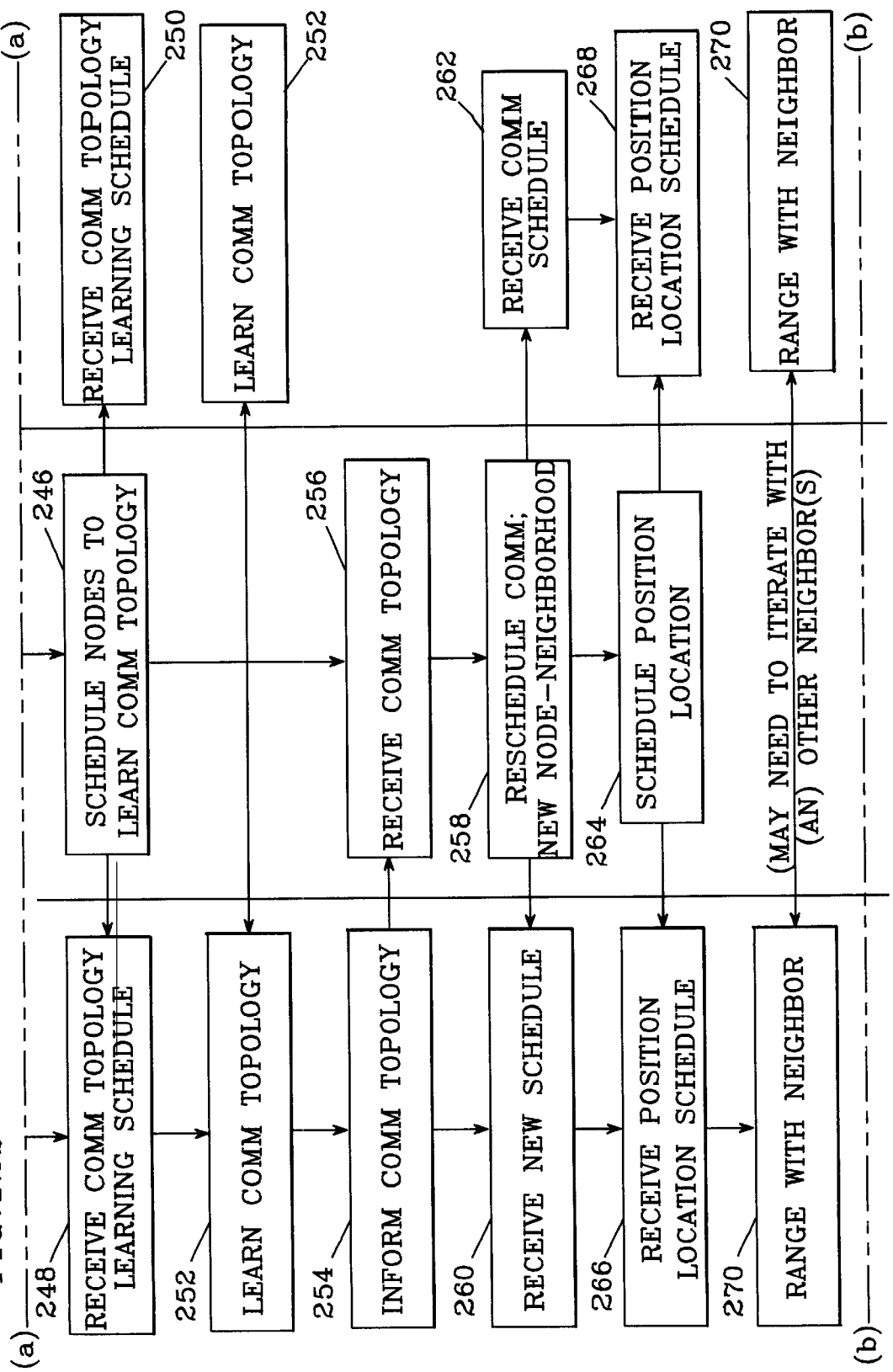
Figure 12C:
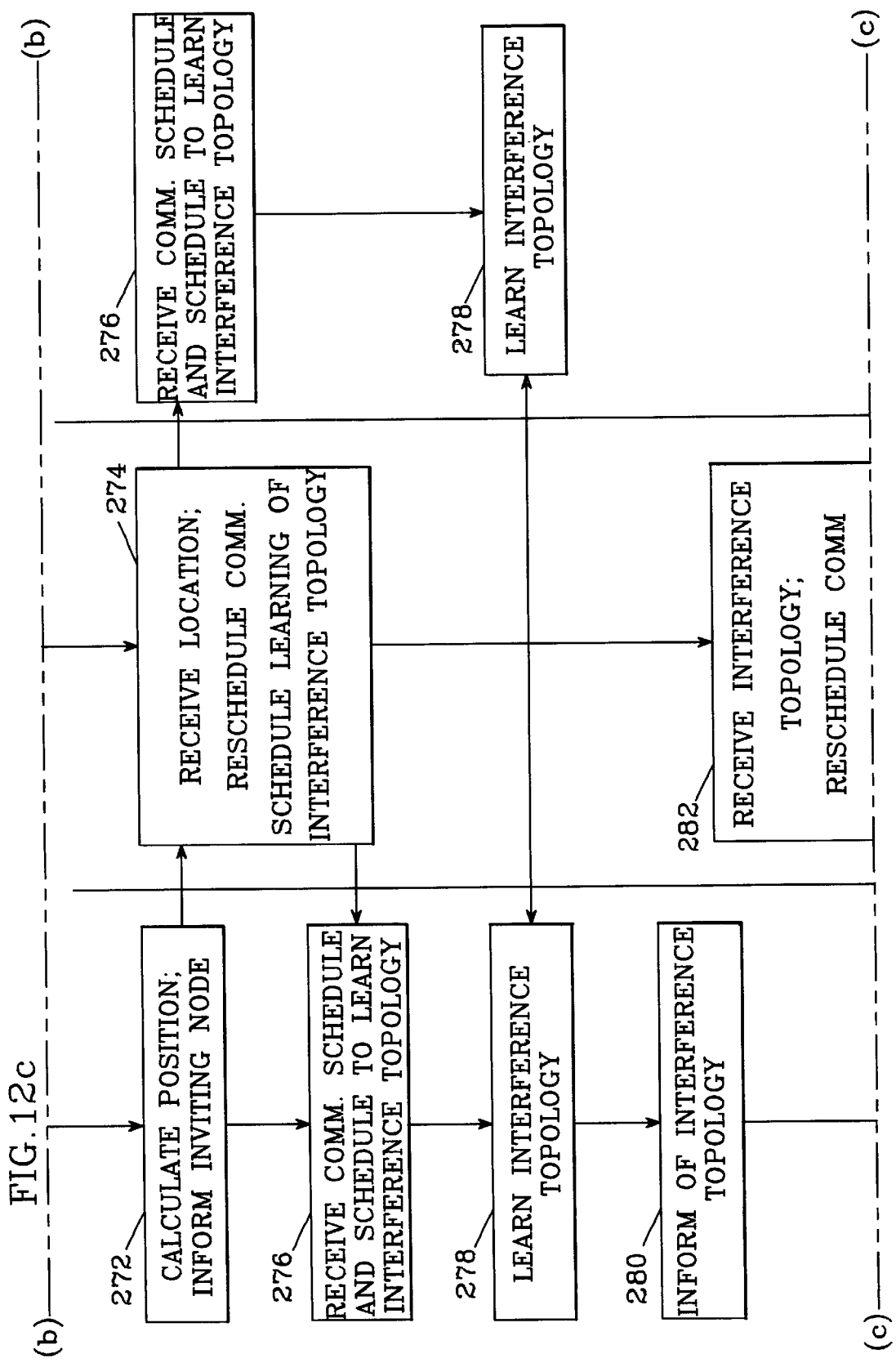
Figure 12D:
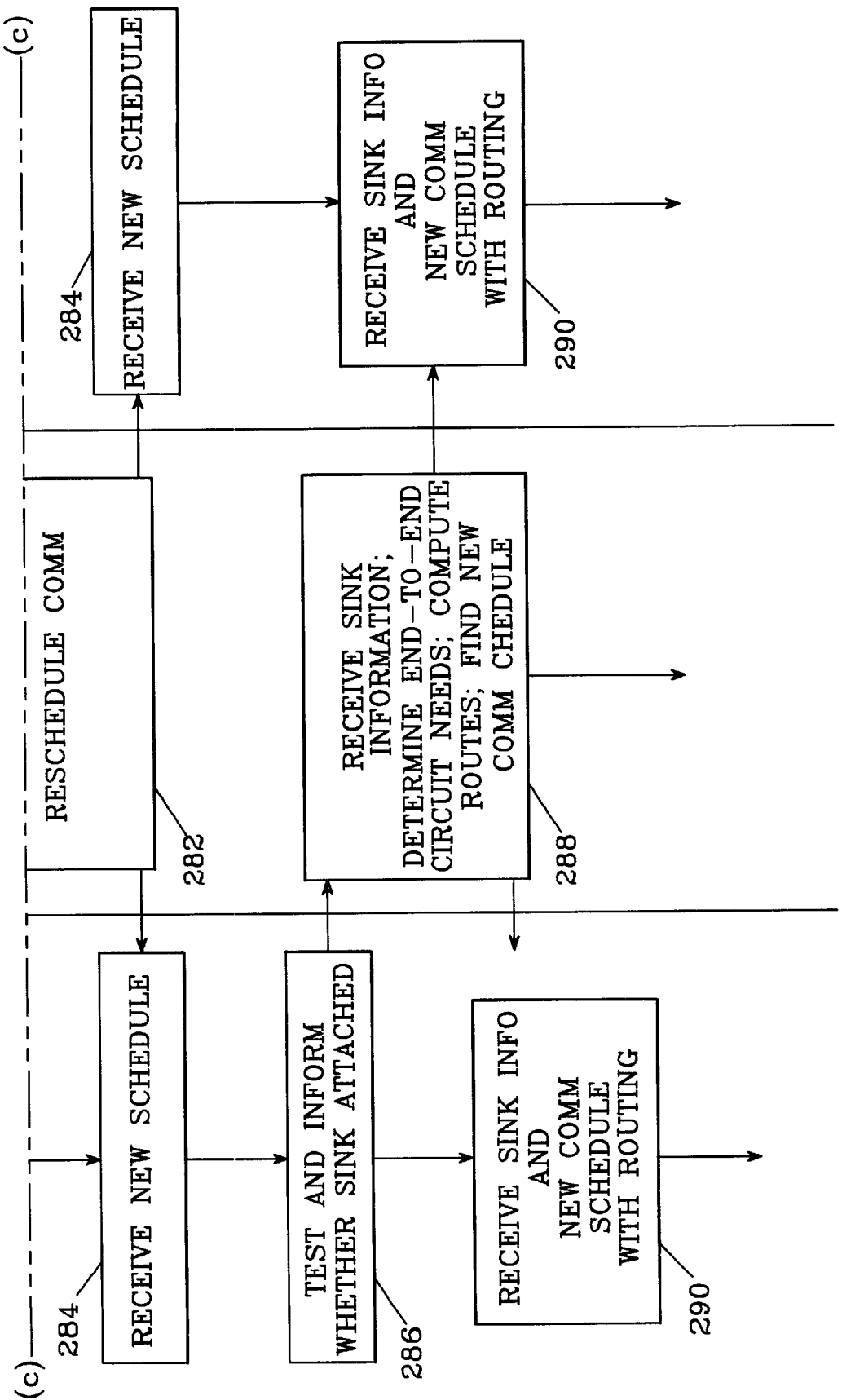

FIGS. 12a–12d taken together, are a flow chart reading from the top of FIG. 12a to the bottom of FIG. 12d and illustrating the detailed steps of the invention. As the method is distributed—the tasks are performed on multiple nodes simultaneously—the chart is to be read in three columns representing activities occurring on the new node, the inviting node, and other active member nodes in their respective columns.

The flow chart begins with the power on (220) of the new node. After power on the new node launches pre-programmed initialization processes including a built-in test and built-in calibrations programs (222). After initialization the new node will listen for an invitation to join a network (224). After listening for one full period p, if the new node does not receive an invitation it will assume that it is the first node of the network and go into inviting node mode. This is shown by a path to the inviting node column.

If an inviting node does issue an invitation (226) which is received by the new node, the new node will respond (228).

The inviting node receives the response from the new node (230), and proceeds to schedule pair-wise communications between the new node and its potential communicating neighbor member nodes so that the new node can learn its communication and interference topologies. The pair-wise communication schedule would preferably be an assignment to each node pair (a "link" between 2 nodes) of a specific time slot in a TDMA time frame; but, as discussed previously, other types of organization are possible, including FDMA.

When the new node receives the pair-wise communication schedule (232), it will exchange, negotiate and launch active processes (232). These active processes could include high priority, overriding instructions or data from the user such as "power down for five minutes" or "all sensors to maximum alert activity." Urgent instructions to the network of this type will be acted on immediately, before completing the topology learning method. This enables a user to send a "message in a bottle" to the network, for example by firing a new node into a network by artillery, or by dropping it from a plane. The active processes launched would also include more routine functions, such as beginning to sense seismic or other sensor-detectable activity in the environment.

Meanwhile, the other member nodes have also received the communication schedule (234). The inviting node and the other active nodes will then launch similar active processes (236). The new node and the inviting node then measure their inter-node range (238). After the range is measured, the inviting node generates a new communication schedule (240), based upon the set of potential communicating neighbors within the measured range, as discussed previously. The new node and the other member nodes will receive the new communication schedule, steps (242 and 244). After generating the general communication schedule, the inviting node will generate (246) a specific schedule of transmissions to be executed between the new node and other active nodes to learn the communication topology as modified by the addition of the new node, and will transmit the schedule. The new node and other active nodes receive the communication topology learning schedule (248 and 250), and execute the schedule of transmissions (252).

After learning the communication topology (the set of communicating neighbors of the new node), the new node will transmit the information to the inviting node (254). When the inviting node receives the communication topology information, (256), it will generate (258) a new communication schedule in the communicating and interference neighborhoods of the new node, and will transmit the new schedule. The schedule is received (260) by the new node and the other member nodes (262). The inviting node then generates (264) a schedule to locate the position of the new node and informs (266) the new node and other member nodes (268) of the schedule. The schedule is then executed. As previously discussed, this involves ranging with one or more neighbors (270) in order to locate the new node. The position of the new node is then calculated by the new node (272), and the inviting node is informed. Upon receiving this information, the inviting node generates (274) another communication schedule for learning the interference topology (the set of nodes which is in the new node's interference neighborhood). When the new node and other member nodes receive (276) the communication schedule, they proceed to execute the schedule (278) and learn the interference topology. Once the interference topology is learned, the new node will inform (280) the inviting node, and the new node will reschedule (282) communications in light of the new and more accurate interference topology information. The inviting node then transmits and the new node and other member nodes receive (284) this new schedule.

Finally, the new node will test itself (286) to determine whether a "sink" is attached, and will inform the inviting node. A "sink" is an output port or node from which information is communicated to the users. It may even be a node hand carried by a user. These are important points where users interface with the network. In some applications it may be useful to perform the sink test, step 286, early in the method, say before the communication schedule/active process step 232, as the user may have high priority for use of the network data. A user may want to quickly tap the network for information without disturbing the topology. In that case the rest of the procedure may be omitted or delayed.

The microprocessor on the inviting node, when it receives (288) the sink information, can calculate the network's end-to-end circuit needs, compute communication routes, and find an overall communication schedule which fits these needs. The new node and the other active nodes then receive this new schedule and routing information (290). Having received the complete routing information and schedule for communication within the network, the new node is now a member of the network and the entire flow chart is repeated from each node in the network as an inviting node until no new nodes are detected.

Figure 13:
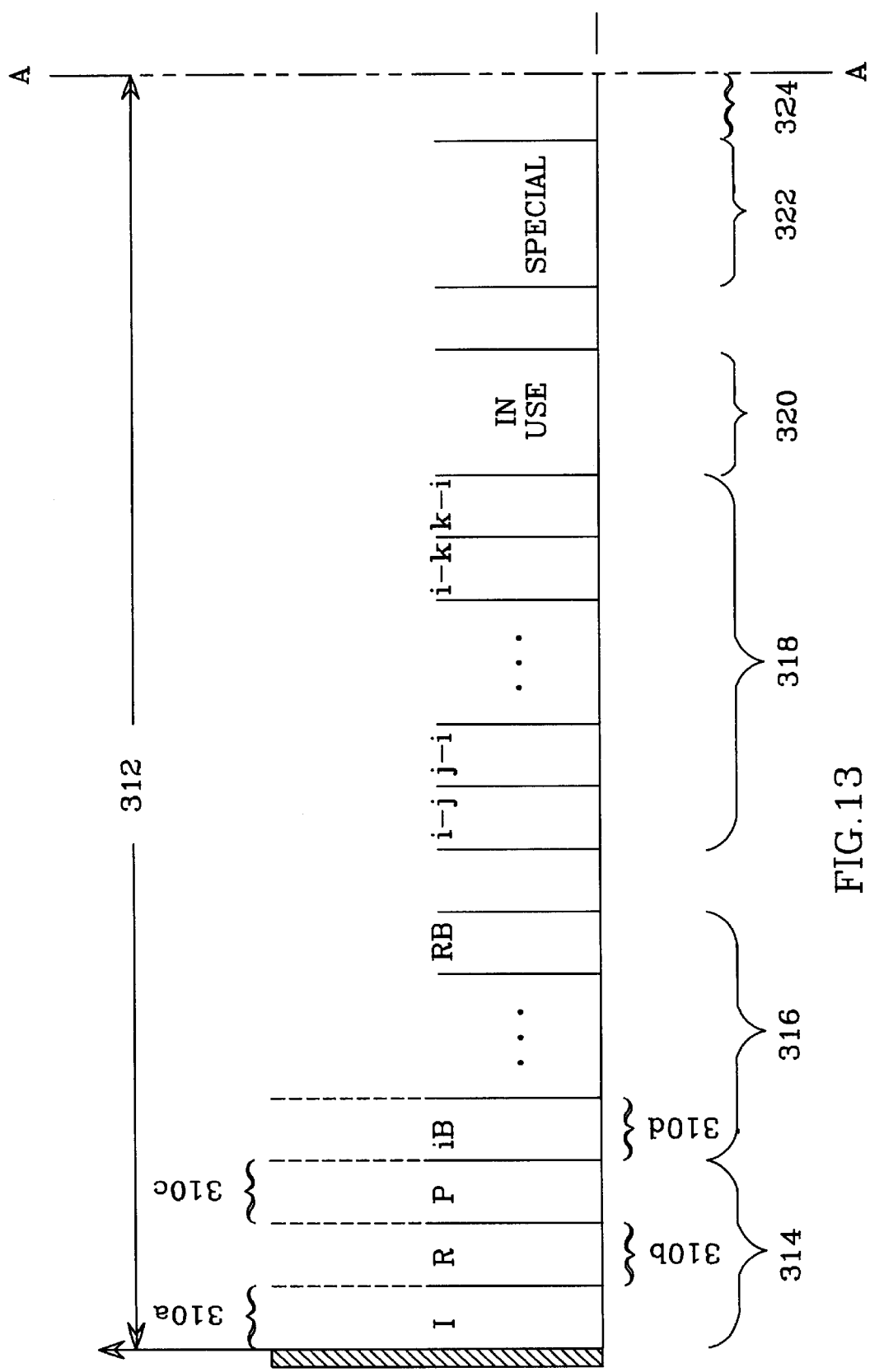
FIG. 13 is a timing diagram showing an example of a time slot allocation within a TDMA time frame which can be used to schedule communications with the invention.

One example of a TDMA frame which can be used to schedule communications between nodes is shown in FIG. 13. Communications are organized into time slots 310$a,b$, etc. within a repeating time frame 312. The frame shown is considered from the point of view of a particular node, node i. There are several types of time slots allocated: network entry slots 314; node i's broadcast slots 316, for simultaneous broadcasts to multiple neighbors; slots 318 for node-to-node communication between node i and its neighbors (one slot for each direction, i to j, and j to i); slots 320 that are allocated to use by other nodes and which cannot be used by node i (interference neighbors' slots); specially assigned slots 322 for temporary high priority needs; and all the rest of the bandwidth (slots 324) available, to be assigned as needed. In the example shown in FIG. 13, which is only one example among many suitable ways of allocating time slots, the network entry slots 314 have special significance in the network's self-organization and topology learning. These slots consist of an invitation slot 310$a$, a response slot 310$b$, and a pointer slot 310$c$. The inviting node broadcasts its invitation (as previously described, step 226 of FIG. 12$a$) within invitation slot 310$a$; the new node responds (step 228 of FIG. 12$a$) within response slot 310$b$ and receives from the inviting node (step 232 of FIG. 12$a$) a pointer in pointer slot 310$c$ which identifies to the new node the correct slot which has been allocated to it for further communications.

Besides adding a node to an existing network, the invention can be used to create an initial network from multiple disorganized nodes. This can be the "startup network" assumed in the above explanation of the invention. Network creation begins with a plurality of deployed nodes, either powered down or placed in a timed inactive mode. When a user turns on a node manually, or when the timed inactive period expires, one of the nodes will be the first to power up or enter active mode. The method follows the flow charts 12$a$ through 12$d$ above, and can be summarized as follows: on commencing active mode the node may perform internal startup procedures (such as checking for connections to users, built in self-tests, start a counter for age measurement). The node then enters a listening mode and the receiver is active to listen for an invitation to join an existing network. After listening for some period longer than the maximum invitation period, if no invitation is received the node assumes it is the first node. Then, pursuant to pre-programming, it prepares a TDMA schedule allocating time slots for an invitation, a response, and at least two slots for bidirectional communication with an anticipated new node. The first node then issues an invitation.

If no response is received, the first (inviting) node may revert to inactive mode, listening again after some time interval, which should preferably include some psuedorandom "jitter." The jitter prevents unwanted synchrony, in which two or more nodes persistently issue simultaneous invitations, causing interference with one another and missing each other's invitations. If no new node is detected, the first node may again transmit an invitation, and the process repeats.

Eventually, if nodes are deployed so that it is possible to form a network, a new node will receive and respond to the first inviting node. The invitation and response will initiate the method described above and illustrated in FIGS. 2 through 12d. The method is essentially the same except that some steps become trivial in the case of only two nodes: there are no other member nodes to schedule for transmission and reception. The inviting node 110 can thus proceed to range with the new node. The exact position of the new node cannot be determined at this point in the network development. The potential communicating and interference neighborhoods are calculated as in the previous example, but they cannot be narrowed. The method can be repeated by both the first and the second nodes to find a third node and add it to the network. A multiple node network can be fully developed eventually, but more transmissions will be necessary to learn the topology because accurate relative locations cannot be calculated for the nodes until enough nodes of known locations are incorporated. Alternatively, relative locations may be calculated (for example, trigonometrically) if sufficient nodes with overlapping communication ranges are incorporated . Even if positions are not calculable, for some applications the topology alone may be useful, and no positional information may be needed. For example, a wireless network may be useful to detect the presence of an intruder even the exact position of the intrusion cannot be located. A network organized topologically would be adequate to relay an intruder alert to a user, even without positional information.

The method can be used with nodes having adjustable transmitter and receiver power. The nodes can be programmed to adjust to a finite number of discrete power levels. The topology learning sequence can then be run separately on each of the individual levels in sequence. To reduce power consumption, the sequence should preferably be run with smaller power levels first.

One special situation deserving consideration is the situation in which two new nodes respond simultaneously to an inviting node. In that case the inviting node and the new nodes must detect that a collision has occurred and use a suitable random access or prioritization technique to schedule retransmission from the new nodes. Various conventional techniques may be used, such as the ALOHA technique described by Norman Abramson, "The Throughput of Packet Broadcasting Channels," *IEEE Transactions on Communications*, Vol. Com-25, No.1, (Jan. 1977). Alternatively, nodes could be assigned priority for retransmission based upon unique assigned identity numbers. The method of FIGS. 12a–d is then used to learn the topology resulting from addition of the first new node, then again to learn the topology resulting from the addition of the second new node.

Node Apparatus

A. General:

The invention is preferably used in a network of micropower, wireless, integrated sensors, as it is specifically designed to enable and exploit low power, dense networks including numerous sensors. Such networks can be realized by providing nodes with a high degree of integration, miniaturization, short communication range, flexible programmability and low cost per node.

Figure 14:
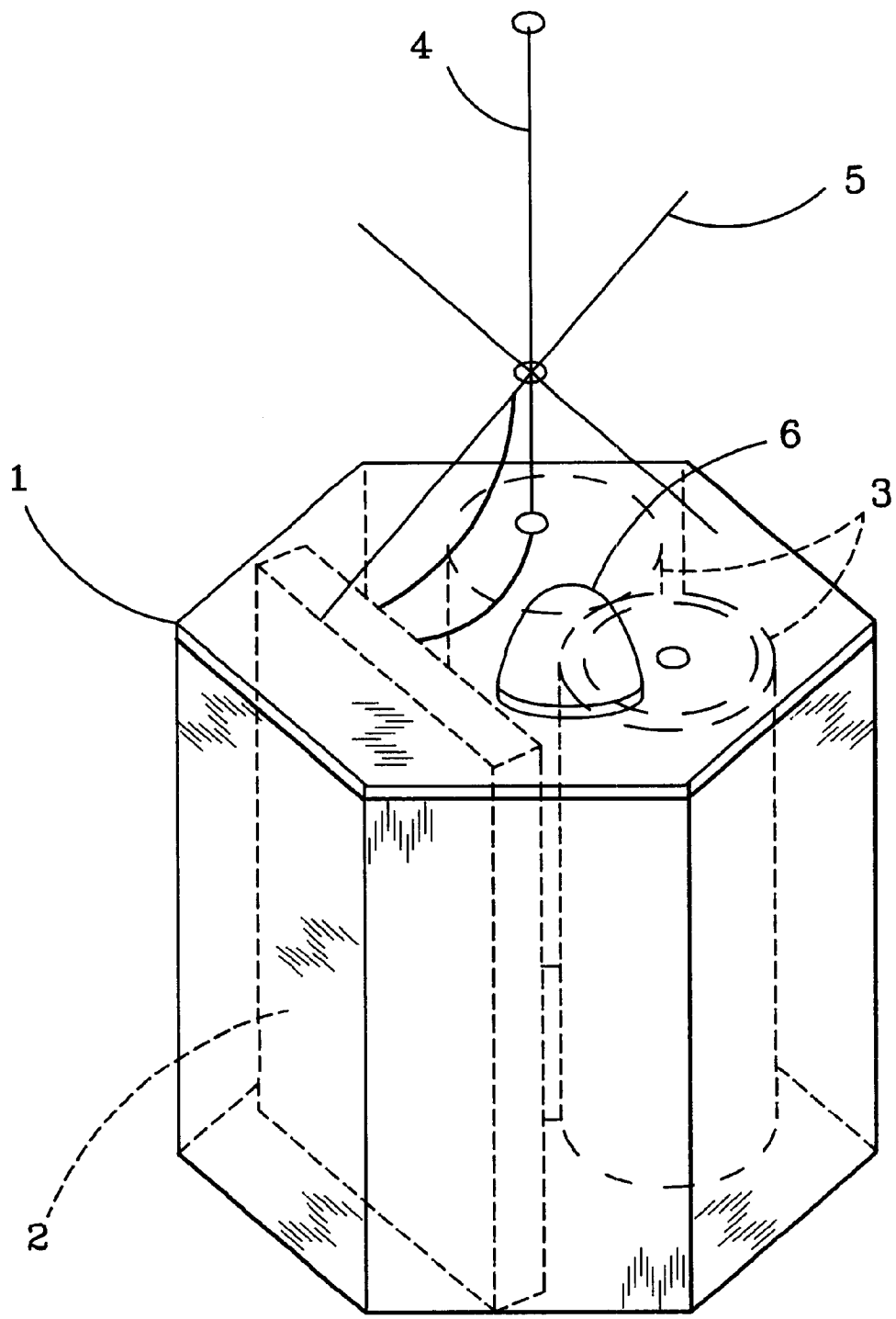
FIG. 14 is an external perspective view of one of the electronic sensing devices or "nodes" of the invention.

FIG. 14 shows one possible realization of a single device or node, as it might be deployed in terrain. The node includes an enclosure 1, which houses and provides environmental protection for the functional components (shown in phantom) including circuitry 2 and power supply (batteries) 3. An antenna 4 is mounted atop the enclosure 1, for transmitting and receiving radio signals. Although the antenna 4 is shown as a vertical dipole with artificial groundplane, other configurations may be used, including conformal antenna loops or even an integrated antenna element. The exterior shape of the node housing 1 could also be varied to take almost any shape, as the application demands. The dimensions of the housing 1 can be varied, with the minimum size limited only by the degree of integration and miniaturization of the circuitry 2 and power supply 3. The illustrated node also includes an acoustic or ultrasonic transducer 6 as shown, for producing a sound pulse. This transducer is optional in general but is present in some embodiments as part of a mechanism to acoustically measure range from neighboring nodes, in a manner described more fully below. In many applications which use the acoustic or ultrasonic transducer 6 for ranging, it is advantageous to use a transducer which provides wide or nearly omnidirectional dispersion of sound, to allow ranging in many directions.

Figure 15:
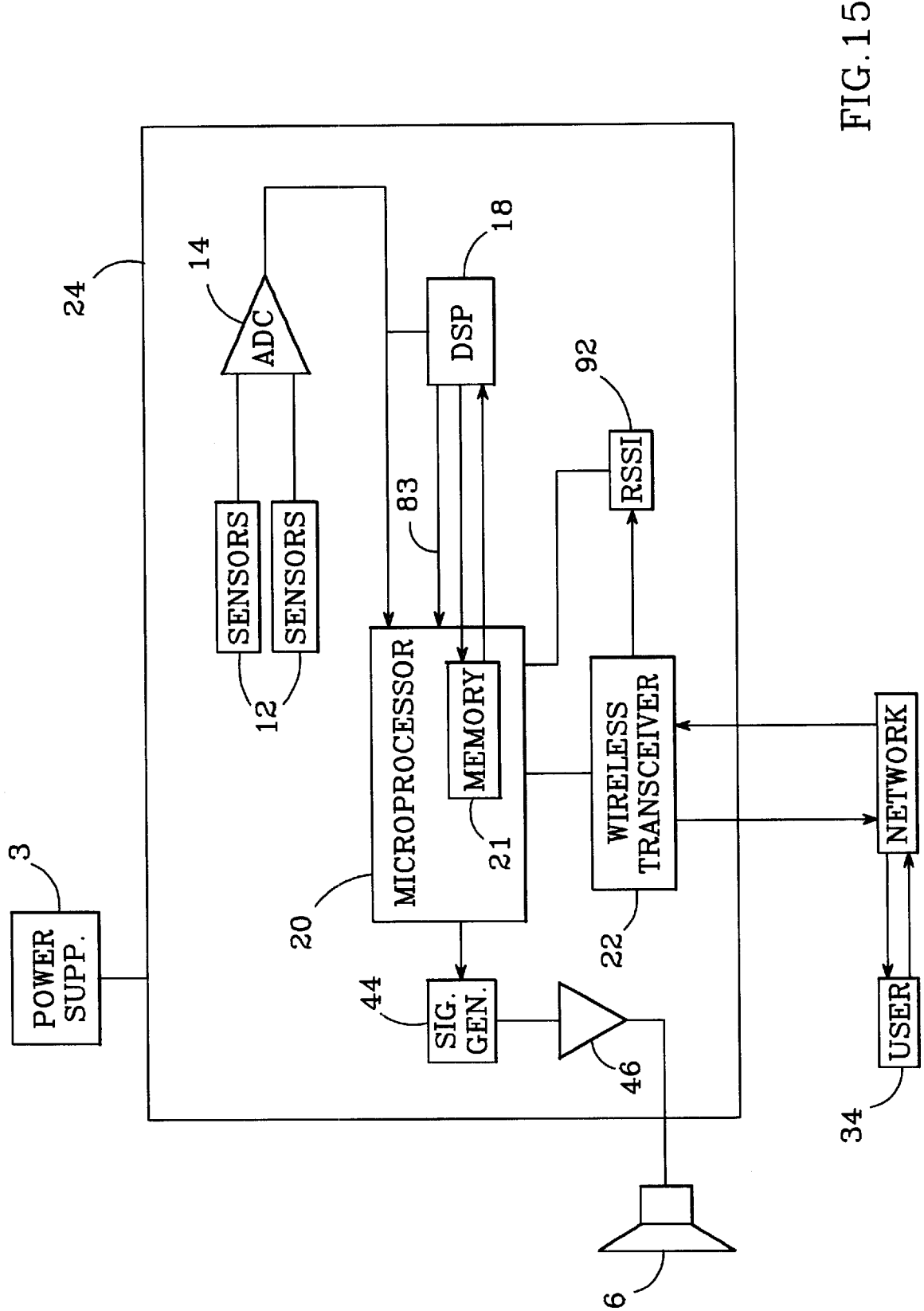
FIG. 15 is a block diagram showing the architecture of one of the electronic sensing devices or "nodes" of the invention.

FIG. 15 shows an architecture for an individual node. Local environmental conditions or changes (including seismic, ultrasonic, sonic, or electromagnetic signals) are sensed by a sensor or sensor arrays 12. In the typical case in which the sensor(s) produce an analog signal or signals, an analog-to-digital converter (ADC) 14 is provided to digitize the data from the sensors. The data is stored for processing in a buffer memory 16. A digital signal processor (DSP) 18 preferably filters and analyzes the stored data to improve signal-to-noise ratio and extract information regarding the amplitude and spectral characteristics of the sensor data. After filtering, the DSP 18 compares the characteristics to user-programmed profiles, and presents the results of the comparison to a microprocessor 20. The microprocessor 20 makes decisions based upon the information from the DSP 18. For example, if certain low frequency signals are detected, indicating a vehicle, it may cause a wireless transceiver 22 to transmit a warning. The microprocessor 20 can if required perform additional signal processing and analysis (for example, decision analysis or target classification) of the data, or by reconfiguring DSP 18 to more closely examine specific spectrum bands. In addition, the microprocessor 20 can be programmed to control and schedule communications with other nodes and/or users, or a second microprocessor can be provided for controlling the wireless transceiver 22 to perform those functions. Microprocessor 20 also preferably controls a signal generator 44, which drives an amplifier 46 to power the acoustic or ultrasonic transducer 6, when required for range finding functions.

Many of the functions of the node, including signal processing, decision making, range finding and communication management, could be performed by separate dedicated microprocessors. Although the invention encompasses multiple microprocessor embodiments, for the sake of simplicity the figures show only one microprocessor 20 performing various functions.

The wireless transceiver 22, controlled by microprocessor 20, provides communications with a network 32 of other nodes and with a user or users 34. Communications are two-way, so that data (spectral or time domain) or instructions can be transmitted, received or relayed. The received data or instructions are stored by the microprocessor 20 and can be used to modify the programming of either the microprocessor 20 or the DSP 18. Because the invention is preferably used in a network of numerous nodes with limited power supplies: (typically battery or solar cell), a transceiver which consumes low levels of power is preferred.

In the preferred embodiment, the several component subsections of the node (the sensors 12, the ADC 14, the DSP 18, the microprocessor 20, signal generator 44, amplifier 46, received signal strength indicator 48 and the wireless transceiver 22) are all fully integrated on a chip 24, powered by a power supply 3 and housed in an enclosure 1. Such integration enables low cost manufacture and an extremely compact package. However, greater or lesser degrees of integration are possible and the resulting nodes are also serviceable with the invention.

The detailed operation and structure of each of the node's subsections will be discussed individually, beginning with the sensors 12.

B. The Sensors 12:

The sensor system must identify a signal in the presence of environmental noise. Source signals (such as seismic, infrared, thermal, optical, acoustic, mechanical, and others) all decay in amplitude rapidly with distance from the source. To increase the detection range, sensor sensitivity must be increased. In addition, due to the fundamental limits of background noise, a maximum detection range exists for any sensor. Thus, it may be desirable to obtain the greatest sensitivity and to utilize compact sensors that may be distributed both widely and densely. In addition, in some applications it is desirable to integrate multiple sensors (with varying characteristics) with the signal processing, control, and wireless transceiver portions of the node, thus increasing the information available from that node.

Integration of the sensors with the other electronics is preferably accomplished by conventional "flip-chip" bonding. In the "flip-chip" process a sensor die and a CMOS interface die are each fabricated. The CMOS interface die is then flipped and bonded to the sensor die, which typically includes the bulk micro-machined sensor structures. This process allows modular processing: the fabrication of the sensor die (with materials incompatible with CMOS processing) is separated from CMOS fabrication. Thus, high performance piezoelectric and pyroelectric actuator and sensor materials may be integrated with CMOS measurement and control systems without interference with CMOS fabrication.

Typical sensors which could be used in the invention are disclosed by U.S. Pat. No. 5,659,195 to William J. Kaiser. This patent discloses, for example, a CMOS integrated microaccelerometer which could be used as a seismometer or vibration sensor. Integrated microacoustic sensors and thermoelectric sensors are also disclosed by the patent. Another thermal infrared sensor suitable for use with the invention is a high sensitivity thin-film radiation thermopile sensor described by David T. Chang in "Micropower High-Detectivity Infrared Sensor System," *Solid State Sensor and Actuator Workshop (Technical Digest)*, TRF cat. no. 98TRF-001, Lib. of Congress no. 98-60214, ISBN no. 0-9640024-2-6, pp. 205–208 (1998). Such devices are well suited to large scale integration with the other components of a node of the present invention; however, non-integrated sensors such as geophones, acoustic detectors, thermal sensors, photoelectric detectors, or even mechanical transducers can be employed either together with or as alternatives to integrated sensors.

In one embodiment of the invention, a conventional microphone is included in the sensor array 12 as an acoustic sensor, in addition to any other sensors included. The microphone is used in the ranging procedure to detect an acoustic pulse or ultrasonic pulse, as described below ("ranging apparatus").

C. The ADC 14:

In a typical embodiment of the invention shown in FIG. 3 the sensors produce analog signal outputs. An ADC 14 must then be provided to convert the sensor output to digital form for processing. A $\Sigma$-$\Delta$ architecture is suitable for use in the ADC for the invention, as it provides low power and low noise operation. Although the low power constraint discourages the use of flash, pipelined, and sequential approximation architectures, any ADC architecture could be used provided that it has sufficient bandwidth and resolution for the sensor data of interest, and further provided that the ADC power consumption is not inconsistent with available power and power supply lifetime considerations.

C. The DSP:

A DSP is preferably provided to analyze the amplitude and spectral characteristics of the signal acquired by the sensors, while improving signal-to-noise ratio for signals within spectral regions of interest. The DSP can then compare amplitude and spectral characteristics of the signal with reference spectral profiles that are either stored or communicated from a network. The results of the comparison, the spectral data, and the raw signal data are made available to the microprocessor 20. This data can be combined by the microprocessor 20 with data from other sensors, if multiple sensors are provided on the node, to extract clues as to the identity, number, size, distance and direction of the signal source (or sources).

The DSP is preferably implemented with emphasis on low power. Lower signal processing rates may be tolerated to enable low power continuous operation, because the bandwidth of typical sensor systems is low, for example approximately 100 Hz for a seismic vibration sensor. A dedicated device may be used, such as one of the spectrum analyzer or fast Fourier transform (FFT) chips which are widely commercially available. Alternatively, the data can be processed by microprocessor 20 under software control; in that case microprocessor 20 also serves as DSP 18.

Comparing an analyzed spectrum to a reference profile provides a way of identifying the source of sensor signals. For example, large heavy vehicles which produce a distinctive spectral signature can be distinguished from other types of signal sources by reference to a pre-programmed frequency profile.

D. The Microprocessor 20:

The microprocessor 20 provides essential control, logic, and programming functions for the node. In addition to making decisions based upon the sensor data, it handles multiple tasks including communication scheduling, topology learning for the network, maintenance and updating of routing tables, calculation of range relative to neighbor nodes or targets, storage of data and relaying of communications between nodes and to or from a user 34.

All of the functions involved in communication scheduling and topology learning, as previously described, are controlled by the (at least one) node microprocessor. The microprocessor at each member node may, for example, store matrices identifying other network member nodes, their locations, their connecting communication links and scheduled time slots for transmission and reception.

The microprocessor 20 may be any of a number of suitable commercially available microprocessors, but should preferably be chosen for low power and flexible power management functions, low cost, and adequate processing capability. For example, candidates would include the AMD "186ER," available from Advanced Micro Devices Corp., or a low power "80186" family processor from Intel. The microprocessor should preferably be capable of temporarily operating in a low power, "sleep" mode, from which it can be "awakened" by an interrupt (generated from, for example, detection of an interesting signal). An application specific processor could be used; in such a case the design should emphasize low power and the ability to exploit low duty cycle by use of a "sleep" mode. When awakened from "asleep" mode by detection of a signal the microprocessor can make a decision regarding the signal and the appropriate course of action—whether to warn other nodes, increase data acquisition, check other spectral signatures, etc. The microprocessor should preferably also be capable of scheduling and controlling RF communications and of enabling/disabling RF and other circuits as the situation demands. In some applications, the microprocessor may route the spectral density information from the DSP 18 and/or the buffered time domain sensor data to the RF transceiver 22 for transmission to the network. The microprocessor 20 can also control uploading or coefficients for the DSP 18 and thus may reconfigure the DSP dynamically, in response to conditions, data, received instructions or programming. For example, the microprocessor 20 can upload coefficients from the memory 21 (typically on-chip memory integral to the microprocessor) into the DSP 18 to narrow or widen the spectral region of focus, move the center frequencies (by modification of the coefficients), or load a new threshold profile for comparison with the signal. This allows the node to cooperate with other nodes in concerted tasks or data acquisition, or to modify its data processing based on the current characteristics of the sensor data.

E. The Wireless Transceiver 22:

In a preferred embodiment, an wireless transceiver 22, under control of the microprocessor 20, provides bidirectional RF communication between a node and other nodes or users, for communicating data, decisions, programming or routine network protocol maintenance information. The transceiver should preferably have the ability to assume a low power consuming "off" mode when it is not needed in a time slot, so that power can be conserved in a TDMA communication scheme.

Figure 16:
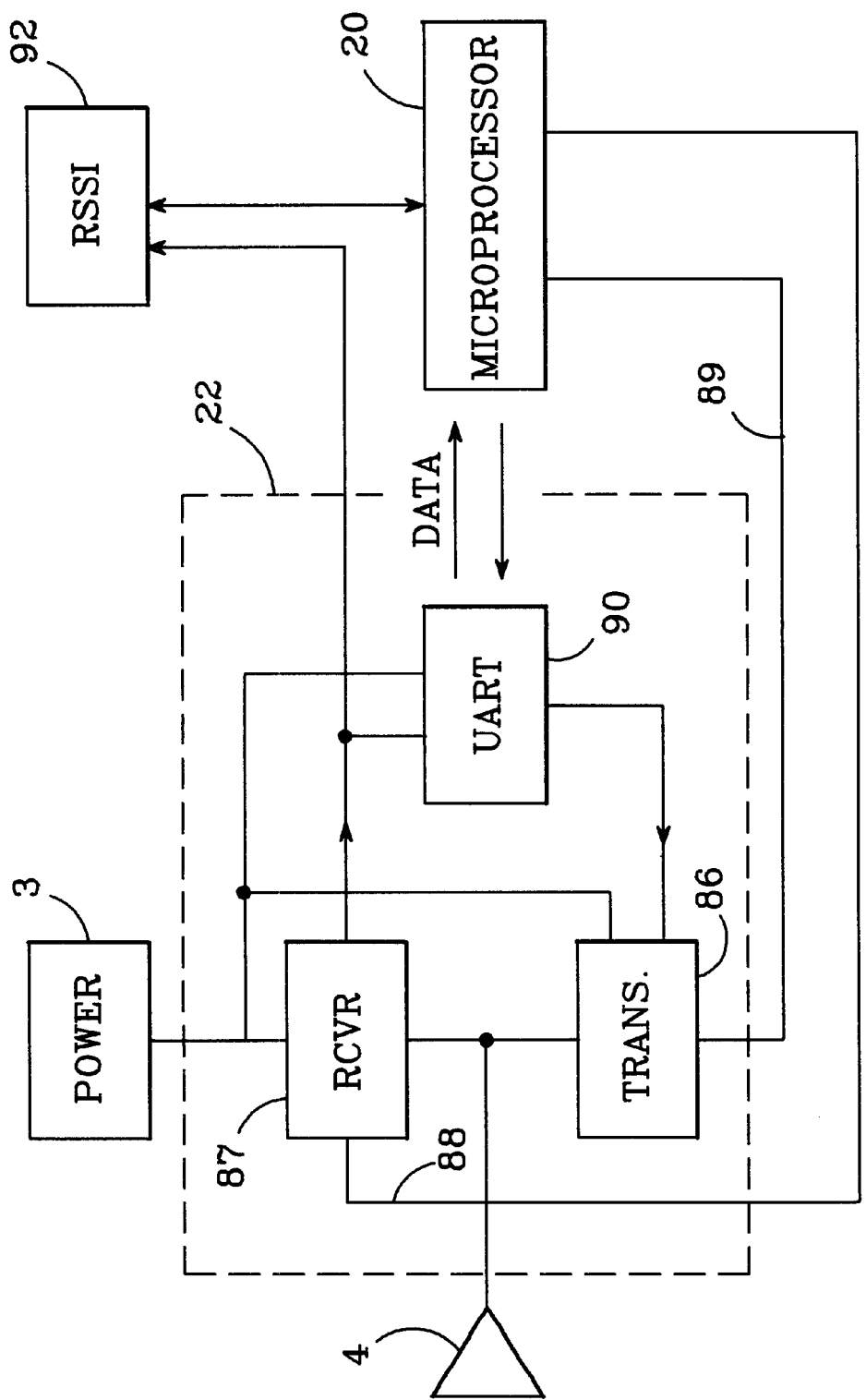
FIG. 16 a block diagram of a wireless transceiver which can be used in the invention.

As shown in FIG. 16, the transceiver 22 preferably includes transmitter 86 and a receiver 87, which share an antenna 4 a power supply 3 (typically batteries). Transmitter 86 and receiver 87 are enabled/disabled by by respective enable signals 88 and 89 from microprocessor 20; a universal asynchronous receiver/ transmitter (UART) controller 90 (for example, the MAX3243CAI chip available from Maxim) handles data transfer between the receiver 87, the transmitter 86 and microprocessor 20. The receiver design should preferably provide low noise and high selectivity while maintaining low power requirements. For some protocols, the receiver should be able to operate during some period at high duty cycle to enable each node to capture randomly arriving signals.

Conventional highly integrated transceivers are available which are suitable for use in the invention. For example, commercially available chipsets would include the Rockwell Digital Cordless Telephone (DCT) chipset, based around the R900DCTM-4 or R900DCTM-3 transceiver modules. These highly integrated transceiver integrated circuits (ICs) are suitable for operation in the 902 to 928 MHz. band, and with suitable accompanying chips, commercially available from the same source, are capable of digital spread spectrum (DSS) operation. Other commercially available ICs which are suitable for use in the invention include the RX2010 receiver and HX2000 or AT1000 transmitters all from RF Monolithics, Inc. Whichever RF ICs are used, they should preferably be chosen for small size, low quiescent and peak power consumption, and short turn on/turn off times. It is most preferred that the transceiver electronics be integrated with the sensor, microprocessor, and signal processing electronics.

In some embodiments, a received signal strenth indicator (RSSI) 92 (shown in FIG. 15) is provided to measure the received signal strength of the RF signal and provide that information to the microprocessor 20. The received signal strength information is useful in some embodiments of the invention, as discussed above in connection with the network self-organization method.

Although the invention is primarily discussed in the context of radio communicating wireless node, the medium of communication could be any other wireless medium, including infrared, optical, acoustic, microwave, or ultrasonic waves. Various means of modulation are all possible and within the intended scope of the invention.

The power output and the receiver sensitivity of the transceiver described above may be made variable in some embodiments, programmable under control of the microprocessor.

F. The Range-finding Components:

In some embodiments, the node is capable of finding its range from another node, facilitating the self-organization of the network. In one such embodiment, microprocessor 20 controls a signal generator 44. When activated by the microprocessor 20 the signal generator produces a signal, which may be at either an audible or an ultrasonic frequency. Lower frequencies are preferred in an application demanding better sonic dispersion; higher frequencies are preferred for very small networks or in covert applications (in which inaudible signals are advantageous). The signal generator 44 drives amplifier 46, which in turn drives the acoustic or ultrasonic transducer 6 to emit a sound pulse.

Figure 17:
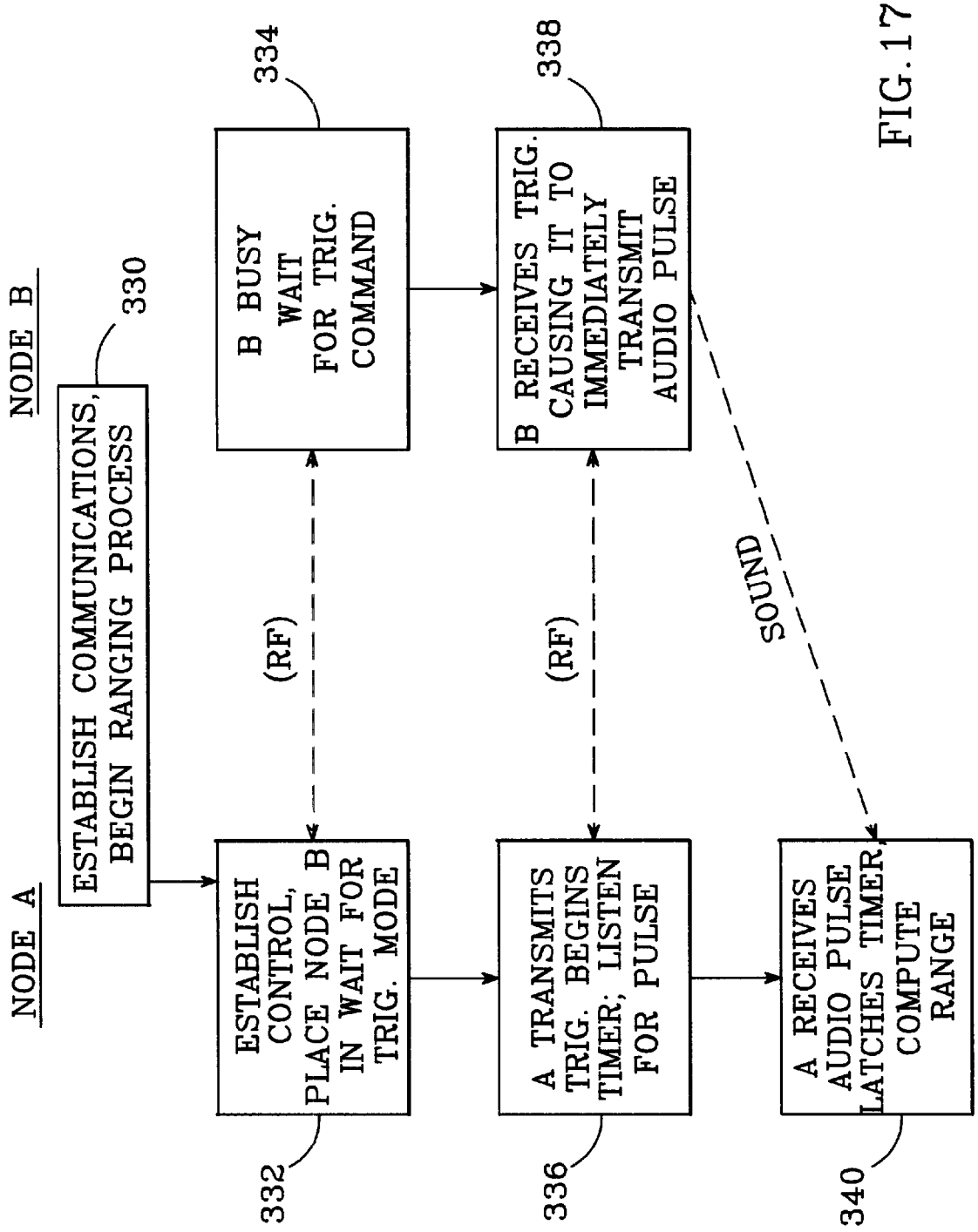
FIG. 17 is a flow chart of a method of ultrasonic or audio range-finding which can be used by the invention.

FIG. 17 shows a flow of operations for range finding by one method of timing an acoustic or ultrasonic pulse. Assume two nodes, node A and node B, are to measure their mutual distance of separation. All operations on a node are most conveniently controlled by that node's own resident programmed microprocessor 20. To find the range from node A to node B, both nodes first establish radio contact and agree to begin ranging (step 330). Next, Node A establishes control and transmits an RF signal to place node B in a waiting mode (step 332). In response, node B waits for an expected RF trigger command (step 334). No other process can cause a delay once B has entered this mode. Next, in step 336 node A transmits the RF trigger command and simultaneously begins a timer and enables the microphone or sensor 12 to detect an audio (or ultrasonic) pulse. The timer may be a simple software loop which checks to see if a signal has been received, and if not increments a counter register and loops back to repeat. When node B receives the RF trigger command, it immediately transmits the audio (or ultrasonic) pulse (step 338). The timer on node A continues running until the pulse is received (step 340), at which time the timer is stopped and latched. The latched time, which is the elapsed time for a sound pulse to travel one way from node B to node A, is then used to calculate the distance from node B to node A using the known velocity of sound in the medium (usually air). The distance calculation could include corrections for factors such as wind, humidity, and temperature (if the necessary information is supplied either by local sensors or by user input). The calculated range is then available for use in the method of topology learning and self-organization described above.

While particular embodiments of the invention have been shown and described, numerous variations and alternate embodiments will occur to those skilled in the art. Accordingly, it is intended that the invention be limited only in terms of the appended claims.

We claim:

1. A method of determining the communication topology of a wireless network consisting of a plurality of distributed nodes, at least one but less than all of which comprise a network of member nodes, each of said nodes having a known maximum communication range g and a known maximum interference range b, said interference range being the range from a transmitting node within which said transmitting node's transmissions may interfere with a receiving node's reception, comprising the steps of:

selecting an inviting member node, one of said member nodes, transmitting to a new non-member node, by wireless transmission from said inviting member node, an invitation to join the network of member nodes, identifying a communicating set of member nodes within communication range g of said new node, in response to said invitation, and identifying an interfering set of member nodes within the interference range b of said new node, in response to said invitation.

2. The method of claim 1, further comprising the step of distributing information identifying the new node and its communicating and interfering sets of member nodes to at least some of said member nodes.

3. The method of claim 1 where said step of identifying a communicating set f member nodes comprises:

approximately determining the distance d from said new node to said inviting member node, calculating a potential communicating set of member nodes, defined as those member nodes within g+d of said inviting member node, transmitting a test signal from each member node of the potentially communicating set of member nodes, and identifying said communicating set of member nodes as the set of those member nodes in the potential communicating set which transmitted a test signal which was accurately received by said new node.

4. The method of claim 3, further comprising:

approximately determining the distance $d_2$ from said new node to a second member node other than the inviting member node, and calculating the possible positions of said new node, relative to said inviting and second member nodes and consistent with the approximate distances d and $d_2$.

5. The method of claim 1, wherein said transmitting and distributing steps use radio.

6. The method of claim 1, wherein said step of selecting a communicating set of member nodes comprises:

approximately determining the distance d from said new node to said inviting member node, identifying a potential communicating set of member nodes, defined as those member nodes within a range g+d of said inviting member node, transmitting a test signal from said new node, and identifying a communicating set of member nodes as those member nodes in the potentially communicating set which accurately receive said test signal.

7. The method of claim 6, further comprising:

approximately determining the distance $d_2$ from said new node to a second member node other than the inviting member node, and calculating the possible positions of said new node, relative to said inviting and second member nodes and consistent with said approximate distances d and $d_2$.

8. The method of claim 6, further comprising, for at least one of the member nodes in said interfering set of member nodes:

transmitting a signal strength test signal from said member node in the interfering set of member nodes, sensing the received signal strength from said transmission at said new node, and restricting the interfering set of member nodes to the subset of its member nodes whose transmissions are received at or above a threshold received signal strength.

9. The method of claim 1, further comprising:

transmitting a probing transmission from a member node in said communicating set of member nodes, simultaneously with said probing transmission, transmitting a jamming transmission from a member node in said interfering set of member nodes, and restricting said interfering set of member nodes to the subset of member nodes whose jamming transmissions prevent accurate reception by the new node of said probing transmissions.

10. The method of claim 1 further comprising:

distributing information identifying the new node and its communicating and interfering sets of member nodes to at least some of said member nodes, redefining said new node as a member node, choosing another inviting member node from among the member nodes, and repeating said transmitting, identifying, distributing, redefining, and choosing steps until all member nodes have been chosen for inviting member nodes.

11. A method of determining the communication topology of a wireless network consisting of a plurality of distributed nodes, at least one but less than all of which comprise a network of member nodes whose positions are known, each of said nodes having a known communication range g, and a known interference range b, said interference range being the range from a transmitting node within which said transmitting node's transmissions may interfere with a receiving node's reception, comprising the steps of:

selecting an inviting member node from said member nodes, selecting a potential interfering set of member nodes, defined as those member nodes within g+b of said inviting member node, scheduling a transmission from said inviting node such that said transmission will not interfere with other scheduled transmissions among member nodes in said potential interfering set of member nodes, transmitting from said inviting member node an invitation for said new node to join a network, determining the approximate distance d from said inviting member node to said new node, selecting a potential communicating set of member nodes, defined as those member nodes within range g+d of said inviting member node, scheduling a first schedule of transmissions from said new node to each node in said potential communicating set of member nodes, executing said first schedule of transmissions from said new node to each node in said potential communicating set of member nodes, scheduling a second schedule of transmission from each member node in the potential communicating set, executing a second schedule of transmissions from each node in said potentially communicating set of member nodes, identifying the transmissions accurately received from said first and second schedules of transmissions, selecting, based on said transmissions received, a set of communicating member nodes, defined as those member nodes actually able to accurately transmit to and receive from said new node, locating said new node relative to a member node having known location, selecting, based on the location of said new node and its known interference range, a set of member nodes actually in interference range of said new node, and distributing among member nodes the information identifying said new node, said set of member nodes actually in communicating range of said new node, and said set of member nodes actually in interference range of said new node.

12. The method of claim 11, further comprising, for at least one of the member nodes in said interfering set of member nodes:

transmitting a signal strength test signal from said member node in the interfering set of member nodes, sensing the received signal strength from said transmission at said new node, and restricting the interfering set of member nodes to the subset of its member nodes whose transmissions are received at or above a threshold received signal strength.

13. The method of claim 11, further comprising, for at least one of the member nodes in said interfering set of member nodes:

transmitting a probing transmission from a member node in said communicating set of member nodes, simultaneously with said probing transmission, transmitting a jamming transmission from a member node in said interfering set of member nodes, and restricting said interfering set of member nodes to the subset of member nodes whose jamming transmissions prevent accurate reception by the new node of said probing transmissions.

14. A network having a plurality of nodes, suitable for placement with at least one node having an unknown location and at least one node having a known location, each node comprising:

a sensor for sensing physical phenomena, a programmable computer, monitoring said sensor, and a wireless transceiver, controlled by said programmable computer, said transceiver having a known communication range and a known interference range within which its transmissions may interfere with receptions by another similar transceiver, said programmable computer being programmed to cause said wireless transceiver to transmit an invitation for another node to join the network, said node being capable of estimating its distance to another node by internode transmissions, said programmable computer being programmed:
   (1) to calculate, from an estimated distance between a node of known location and a node of unknown location, an estimated position of said node of unknown location,
   (2) to identify a set of communicating nodes in communication range of said node of unknown location, based on said estimated position, and a set of interfering nodes in interference range of a new node,
   (3) to store information identifying both said sets of nodes, and
   (4) to cause said wireless transceiver to distribute said identifying information.

15. The network of claim 14, wherein said programmable computer on a node of unknown location is further programmed to identify said set of communicating nodes by causing its wireless transceiver to transmit a test signal and to identify a set of communicating nodes which acknowledge reception of said test signal.

16. The network of claim 14, wherein said programmable computer on at least one node is programmed: (a) to determine a potential communication area for said node of unknown location, (b) to cause said wireless transceiver on each node in said potential communication area to transmit a test signal, and (c) to identify said set of communicating nodes as those nodes within said potential communication area whose whose transmitted test signals are received by said node of unknown location.

17. The network of claim 14, wherein said programmable computer on at least one node is programmed to estimate the distance from said node of unknown location to multiple nodes of known location.

18. The network of claim 14, wherein said programmable computers at some nodes are programmed to cause a transceiver to transmit a probing transmission from a node of known location in the communicating set of nodes, while simultaneously causing the transceiver for a node in the interfering set of nodes to transmit a jamming transmission; and at least one of said programmable computers is further programmed to identify a restricted subset of the interfering set of nodes whose jamming transmissions prevent accurate reception, at said node of unknown location, of said probing transmission.

19. The network of claim 14, wherein said programmable computers for some nodes are programmed:
   (a) to cause their associated transceivers to initiate a signal strength test signal from a node in the interfering set of nodes, and to sense the received signal strength at said node of unknown location, and
   (b) to calculate a restricted subset of the interfering set of nodes whose transmissions are received at or above a threshold of received signal strength.

* * * * *